United States Patent [19]
Cunha et al.

[11] Patent Number: 5,743,708
[45] Date of Patent: *Apr. 28, 1998

[54] TURBINE STATOR VANE SEGMENTS HAVING COMBINED AIR AND STEAM COOLING CIRCUITS

[75] Inventors: Francisco J. Cunha, Schenectady; David A. DeAngelis, Voorheesville; Theresa A. Brown, Clifton Park; Sanjay Chopra, Albany; Victor H. S. Correia, New Lebanon; Daniel R. Predmore, Clifton Park, all of N.Y.

[73] Assignee: General Electric Co., Schenectady, N.Y.

[*] Notice: The term of this patent shall not extend beyond the expiration date of Pat. No. 5,634,766.

[21] Appl. No.: 674,476

[22] Filed: Jul. 2, 1996

Related U.S. Application Data

[60] Division of Ser. No. 414,697, Mar. 31, 1995, Pat. No. 5,634,766, which is a continuation-in-part of Ser. No. 294,671, Aug. 23, 1994, abandoned.

[51] Int. Cl.$^6$ ................................ F01D 9/04; F01D 9/06
[52] U.S. Cl. .................. 415/115; 415/191; 415/209.2; 415/209.3
[58] Field of Search ........................... 415/114, 115, 415/116, 189, 190, 191, 209.2, 209.3, 915; 416/96 R, 96 A, 97 R; 60/39.53, 39.58, 39.59

[56] References Cited

U.S. PATENT DOCUMENTS

| | | | |
|---|---|---|---|
| 3,628,880 | 12/1971 | Smuland et al. | 415/115 |
| 3,807,892 | 4/1974 | Frei et al. | 415/116 |
| 4,017,207 | 4/1977 | Bell et al. | |
| 4,257,734 | 3/1981 | Guy et al. | 415/115 |
| 4,355,952 | 10/1982 | Brown et al. | |
| 4,379,677 | 4/1983 | Hallinger et al. | |
| 4,573,865 | 3/1986 | Hsia et al. | |
| 4,666,368 | 5/1987 | Hook, Jr. et al. | 415/115 |
| 4,721,433 | 1/1988 | Peindel et al. | |
| 4,826,397 | 5/1989 | Shook et al. | |
| 5,100,291 | 3/1992 | Glover | |
| 5,116,199 | 5/1992 | Ciokajlo | |
| 5,176,496 | 1/1993 | Correia et al. | 415/209.2 |
| 5,205,115 | 4/1993 | Plemmons et al. | |
| 5,219,268 | 6/1993 | Johnson | |
| 5,232,343 | 8/1993 | Butts | |
| 5,253,976 | 10/1993 | Cunha | |
| 5,259,730 | 11/1993 | Damlis et al. | 416/96 A |
| 5,320,483 | 6/1994 | Cunha et al. | |
| 5,320,485 | 6/1994 | Bourguignon et al. | 415/115 |
| 5,363,654 | 11/1994 | Lee | |
| 5,374,866 | 12/1994 | Gill et al. | |
| 5,391,052 | 2/1995 | Correia et al. | |
| 5,393,198 | 2/1995 | Noda et al. | 415/115 |
| 5,464,322 | 11/1995 | Cunha et al. | |

FOREIGN PATENT DOCUMENTS

| | | |
|---|---|---|
| 0392664 | 10/1990 | European Pat. Off. |
| 0605153 | 7/1994 | European Pat. Off. |
| 0113204 | 6/1984 | Japan .................. 416/97 R |
| 1605220 | 8/1984 | United Kingdom |
| 2267737 | 12/1993 | United Kingdom |

OTHER PUBLICATIONS

"Advanced Cooled First Stage Vane Design"; Levari et al.; ASME 84–GT–219.

"Flow in Corners of Passages with Noncircular Cross Sections"; Eckert et al.; ASME Paper, Aug. 22, 1955.

*Primary Examiner*—Christopher Verdier
*Attorney, Agent, or Firm*—Nixon & Vanderhye

[57] ABSTRACT

Turbine stator vane segments have inner and outer walls with vanes extending therebetween. The inner and outer walls are compartmentalized and have impingement plates. Steam flowing into the outer wall passes through the impingement plate for impingement cooling of the outer wall surface. The spent impingement steam flows into cavities of the vane having inserts for impingement cooling the walls of the vane. The steam passes into the inner wall and through the impingement plate for impingement cooling of the inner wall surface and for return through return cavities having inserts for impingement cooling of the vane surfaces. The trailing edge is air-cooled.

13 Claims, 18 Drawing Sheets

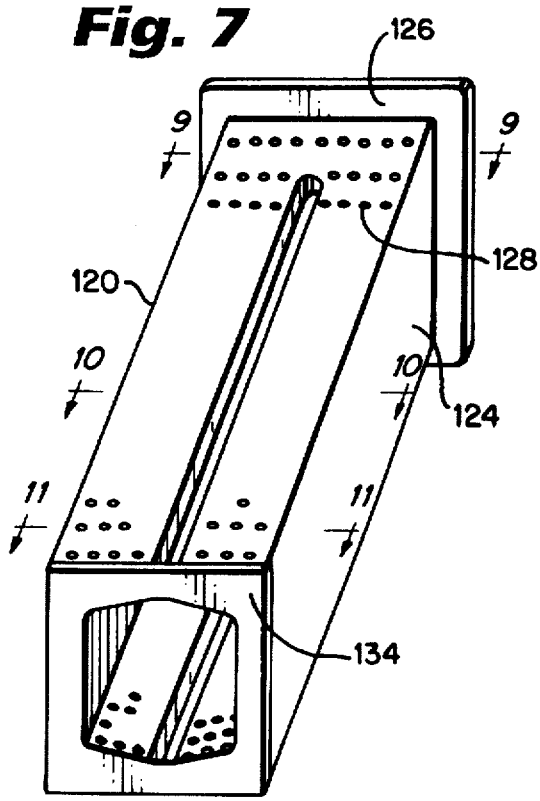
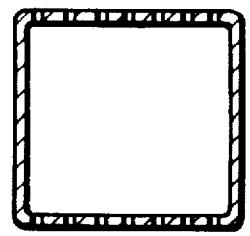
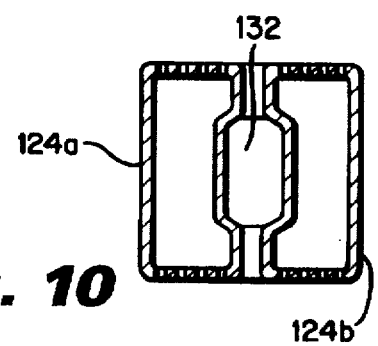
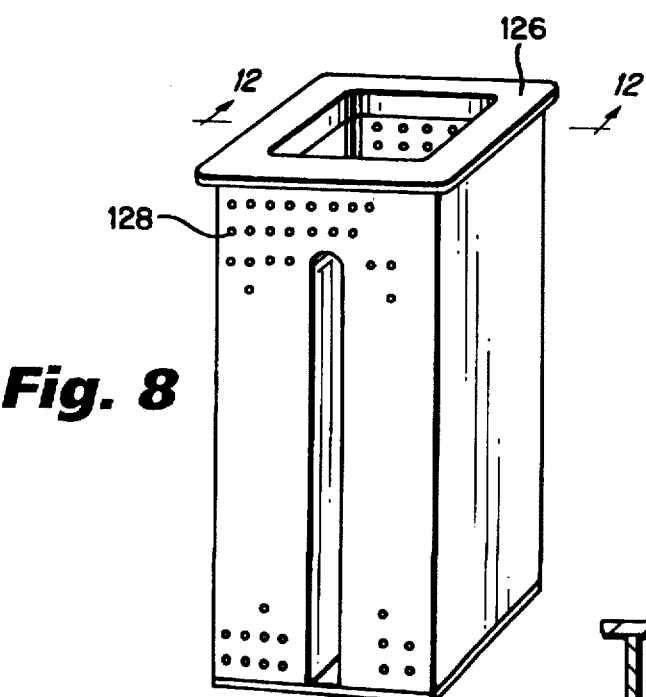
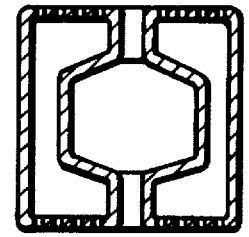
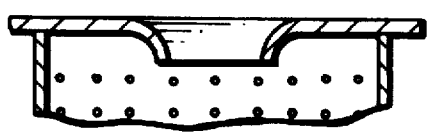

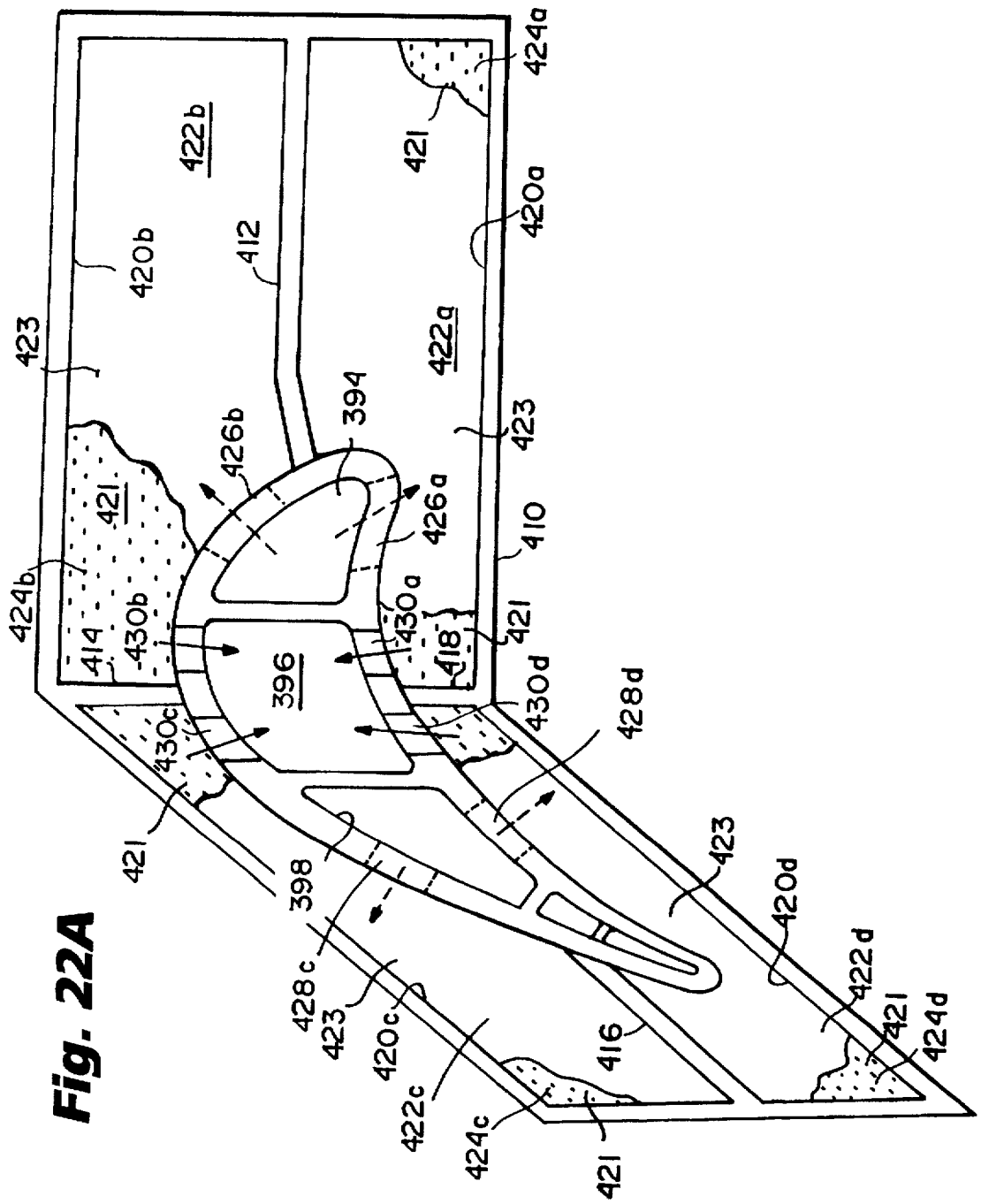

TURBINE STATOR VANE SEGMENTS HAVING COMBINED AIR AND STEAM COOLING CIRCUITS

RELATED APPLICATIONS

This is a divisional application of application Ser. No. 08/414,697, filed Mar. 31, 1995, now U.S. Pat. No. 5,634,766, application Ser. No. 08/414,697 being a continuation-in-part application Ser. No. 08/294,671, filed Aug. 23, 1994, now abandoned, and which application Ser. No. 08/294,671 is incorporated herein by reference.

TECHNICAL FIELD

The present invention relates generally to land based gas turbines, for example, for electrical power generation, and particularly to combined air and thermal fluid, e.g., steam, cooling circuits for the first and second nozzle stages of a turbine.

BACKGROUND

The traditional approach for cooling turbine blades and nozzles is to extract high pressure cooling air from a source, for example, by extracting air from the intermediate and last stages of the turbine compressor. A series of internal flow passages are typically used to achieve the desired mass flow objectives for cooling the turbine blades. In contrast, external piping is used to supply air to the nozzles with air film cooling typically being used. However, the diverted coolant air does not receive energy directly from the combustors of the turbine and represents a parasitic loss to turbine output and degrades overall performance.

In advanced gas turbine designs, it has been recognized that the temperature of the hot gas flowing past the turbine components could be higher than the melting temperature of the metal. It is therefore necessary to establish a cooling scheme to protect the hot gas path components during operation. Using closed circuit steam to cool gas turbine nozzles (stator vanes) has been demonstrated to be a preferred cooling media, particularly for combined-cycle plants. See, for example, U.S. Pat. No. 5,253,976 of common assignee herewith. Because steam has a higher heat capacity than the combustion gas, it is inefficient to allow the coolant steam to mix with the hot gas stream. Consequently, it is desirable to maintain cooling steam inside the hot gas path components in a closed circuit. A complication arises, however, that the coolant supply pressure level is usually much higher than that of the hot gas stream. Thin walls, desirable for cooling purposes, may not be sufficient to withstand the pressure difference without incurring excessive mechanical stresses. That is, the necessary thickness to maintain structural integrity would drastically increase the magnitude of the required cooling flow. Thus, it has been found desirable to provide nozzle vane segments which can be cooled while operating under high thermal fluxes and high pressures.

Moreover, because of the various and multiple piping arrangements necessary to steam cool the non-rotating components in the hot gas path of the turbine, it is not practical to cool certain regions of those components with steam supplied in a closed circuit. For example, the relatively thin structure of the trailing edges of the nozzle vanes effectively precludes steam cooling of those edges.

DISCLOSURE OF THE INVENTION

For discussion purposes, the combined steam and air cooling circuits for the first and second stage nozzles of this invention constitutes one aspect of a novel and improved turbine which is the subject of a number of co-pending patent applications, certain of which are listed below. In that turbine, preferably four stages are provided with an inner shell mounting the first and second stage nozzles as well as the first and second stage shrouds while an outer shell mounts the third and fourth stage nozzles and shrouds. It will be appreciated, however, that a greater or lesser number of turbine stages as well as a different number of nozzle stages and shrouds supported by the inner and outer shells may be provided. Such turbine is designed for conversion between air and steam cooling of the rotational and stationary components. Where an air-cooled turbine is provided, it will be appreciated that cooling air is supplied to the stationary components, e.g., the first and second stage nozzles as part of high pressure discharge air from the compressor. The cooling air is supplied in an open circuit exiting the partitions or vanes of the first and second stage nozzles for film cooling into the hot gas stream. Cooling air may similarly be piped directly through the outer shell to the third stage nozzle while the fourth stage nozzle remains uncooled. Open air-cooled circuits are also provided for the rotational components of the turbine, i.e., the buckets in a conventional manner.

In a closed circuit steam-cooling system for the above-noted turbine, closed circuit steam-cooling supply and spent cooling steam return conduits as well as closed circuit steam-cooling conduits for the turbine rotor for delivery of the cooling steam to the buckets of the first and second stages as well as to the rotor wheel cavities and the rotor rim are provided. The present invention addresses the steam cooling circuits provided each of the nozzles of the first and second stages by way of discrete steam supply and spent cooling steam exit pipes coupled to the nozzles through the inner shell and releasably coupled at their outer ends to the outer shell. It also addresses an air cooling system for the trailing edge of the first stage nozzle in combination with the closed steam cooling circuit therefor.

To summarize the state of development of this new turbine, the use of inner and outer shells to support stationary components of the turbine which can be converted between air steam-cooling is described and illustrated in co-pending patent application Ser. No. 08/414,698, now U.S. Pat. No. 5,685,693, entitled Removable Inner Turbine Shell with Bucket Tip Clearance Control, the disclosure of which is incorporated herein by reference. For a complete description of the steam-cooled buckets, reference is made to companion co-pending patent application Ser. No. 08/414,700 entitled Closed Circuit Steam-Cooled Bucket, now U.S. Pat. No. 5,536,143, the disclosure of which is incorporated herein by reference. Air-cooled buckets are well known in the art, for example, reference may be made to U.S. Pat. Nos. 5,340,274; 5,259,730 and 5,232,343. For a complete description of the steam (or air) cooling circuit for supplying cooling medium to the first and second stage buckets through the rotor, reference is made to co-pending patent application Ser. No. 08/414,695, entitled Closed or Open Circuit Cooling of Turbine Rotor Components, now U.S. Pat. No. 5,593,274. The present invention therefore addresses the steam-cooled first and second stage nozzles for that turbine which replace the air-cooled nozzles thereof when the air-cooled turbine is converted to a steam-cooled turbine or when the latter is provided as an initial steam-cooled turbine.

In accordance with the present invention, there is provided a closed circuit cooling system for cooling the hot gas components of nozzle stages of a gas turbine, particularly the first and second nozzle stages, in combination with an open circuit air cooling system for certain of those components. Particularly, nozzle vane segments are provided having the necessary structural integrity under high thermal fluxes and pressures affording a capacity of being cooled by a cooling medium, preferably steam, flowing in a pressurized closed circuit and in combination with open air circuit cooling. More particularly, the present invention provides, in each of the first and second stages of a turbine, a plurality of nozzle vane segments each of which comprise one or more nozzle vanes extending between outer and inner side walls. The vanes have a plurality of cavities in communication with compartments in the outer and inner side walls for flowing a cooling media, preferably steam, in a closed-circuit path for cooling the outer and inner walls and the vanes, per se. To provide structural integrity for the segments, the outer and inner side walls and the vanes, and as well as one or more hooks on the outer side walls for the second stage nozzle segments are integrally formed, preferably by casting, to provide the structural strength necessary to support the plural nozzle vane segments as part of the stage of the turbine.

The nozzle vane segments for the first and second stages of the gas turbine have different combined thermal fluid (steam) and air cooling circuits and those cooling circuits for each of the first and second stage nozzles will now be described. Turning first to the first stage nozzle, each nozzle segment includes an integrally cast outer wall, an inner wall and at least one vane extending between the inner and outer walls. The outer wall has a plurality of structural strengthening ribs extending along an outer surface of that wall. Additionally, a continuation of the walls of the vane project through the outer wall. The ribs are spaced from the vane walls and passages are provided through the vane walls for directing a cooling medium, e.g., steam, for passage through the openings into leading and aft cavities extending radially through the vane. An impingement plate is disposed in overlying relation to the ribs and has a plurality of impingement cooling openings communicating between a plenum radially outwardly of the impingement plate and the chambers defined by the ribs. An inlet to the plenum provides steam into the plenum and through the impingement plate openings for impingement cooling of the outer wall of the segment. The spent impingement cooling steam is directed by the ribs through the openings into the leading and aft cavities of the vane for flow to the inner wall. The inner wall similarly has a plenum for receiving the spent cooling steam from the outer wall and vanes (as discussed below). Along the radially inner side of the inner wall are provided a plurality of structural strengthening ribs and a wall defining the outline of the vane. The wall has a plurality of openings affording communication with three cavities in the vane for return of the steam to a steam outlet pipe in the outer wall. An impingement plate lies intermediate the plenum in the inner wall and the ribs whereby cooling steam passes through the impingement plate for impingement cooling of the inner wall and is directed by the ribs through the openings in the extended vane wall for return flow into and through the cavities to the spent steam outlet.

Impingement cooling is provided in the leading and aft cavities of the vane, as well as in the return cavities of the first stage nozzle vane. Inserts in the leading and aft cavities comprise sleeves having a collar at their inlet ends for connection with integrally cast flanges in the outer wall and extend through the cavities spaced from the walls thereof. The inserts have impingement holes in opposition to the walls of the cavity whereby steam flowing into the inserts flows outwardly through the impingement holes for impingement cooling of the vane walls. Return channels are provided along the inserts for channeling the spent impingement cooling steam. Similarly, inserts in the return intermediate cavities have impingement openings for flowing impingement cooling medium against the side walls of the vane. Those inserts also have return cavities for collecting the spent impingement cooling steam and transmitting it to the steam outlet.

The first stage nozzle segments also provide for air cooling of the trailing edge. More particularly, compressor discharge air is supplied to a trailing edge cavity through both the inner and outer walls of the segments. The trailing edge has a plurality of radially spaced passages for flowing cooling air from the trailing edge cavity through the passages for cooling the adjacent side walls. Air film cooling is also provided by a plurality of forwardly directed openings recessed in radial grooves along opposite sides of the trailing edge in communication with the trailing edge cavity. Cooling air exiting these openings film cools the sides of the vane along the trailing edge cavity. Additionally, air is supplied behind a partition in the inner wall for flow through flow openings adjacent the trailing edge of the adjoining side edges of the segments. The cooling air cools the side edges.

The second stage nozzle has a similar but different cooling arrangement employing closed circuit steam cooling and air cooling. Particularly, the second stage nozzle segments include an outer wall having a plurality of structural strengthening ribs extending along an outer surface of the wall defining a plurality of compartments outwardly of the outer surface. The ribs are undercut or provided with openings for communicating a cooling steam, from an inlet to the segment into the compartments. Impingement plates are disposed in each compartment defining inner and outer chambers. The cooling media is inlet to the outer chambers through the undercuts or openings in the ribs for flow through a plurality of openings in the impingement plates for impingement cooling flow against the outer surface of the outer side wall. Additionally, the compartments lie in communication with one or more of cavities extending internally within the vanes for flowing the cooling steam into the vanes. The inner side wall is similarly compartmentalized by at least one rib and also includes impingement plates in the compartments defining inner and outer chambers. The cavities of the vane have outlets in communication with the inner chambers of the inner side wall whereby cooling steam flows through the openings of impingement plates into the outer chamber of the inner compartments for impingement cooling of the inner side wall. The vanes include exit openings in communication with the outer chambers of the inner side wall for flowing the cooling steam through a return cavity within the vanes for flow through an exhaust port outwardly of the outer side wall.

Impingement cooling of the vanes is also provided in these second stage nozzle segments. To accomplish this, inserts are provided the majority of the cavities of the second stage nozzle vane. For example, an insert is provided the cavity adjacent the leading edge of the vane and includes a sleeve having at its outer end openings in communication with the inner chambers of the compartments and the outer side wall for flowing steam into the insert sleeve. The interior walls of the cavities have a plurality of inwardly projecting ribs at spaced locations lengthwise therealong. In each such cavity, these ribs define with the insert sleeve a plurality of spaced gaps between the insert and the interior wall. The insert sleeve has a plurality of openings for flowing steam from within the insert sleeve through the openings for impingement cooling against the inner surface of the vane in each gap. The steam flows to a return channel formed between a portion of the insert sleeve and an interior wall of the cavity for flow into the inner chambers of the inner side wall. The outer chambers of the inner side wall have openings communicating the steam into a second or return cavity within the vane. The return cavity similarly has an insert sleeve with openings for flowing the returning steam through the openings for impingement cooling of the return cavity. It will be appreciated that the return cavity likewise has ribs projecting from its inner wall surface, defining gaps whereby the steam flows into the gaps and into a return channel between the insert and the cavity wall. The returning steam is returned to a plenum outside of the outer side wall for exhaust.

Additionally, an air circuit is provided for cooling one of the cavities, preferably the last cavity adjacent the trailing edge of the vane. For this purpose, air is inlet through suitable inlet ports in the outer side wall for cooling flow through the trailing edge cavity and directly into a plenum inwardly of the inner side wall. A plurality of openings are provided through the forward and aft surfaces of the diaphragm whereby the cooling air flows into the wheel cavities of the turbine for cooling purposes and also to prevent leakage of hot gases of combustion into the wheel space.

In a preferred embodiment according to the present invention, there is provided a turbine vane segment, comprising inner and outer walls spaced from one another, a vane extending between the inner and outer walls and having leading and trailing edges, the vane including a plurality of discrete cavities between the leading and trailing edges and extending lengthwise of the vane for flowing a cooling medium, the outer wall having a plurality of ribs along an outer surface thereof defining a plurality of compartments outwardly of the outer surface, a cover for the outer wall spaced from the outer surface, an impingement plate between the cover and the outer surface defining outer and inner chambers on opposite sides of the impingement plate, a cooling medium inlet for the segment for enabling passage of the cooling medium into the outer chamber of the compartment, the impingement plate having openings enabling passage of the cooling medium from the outer chamber into the inner chamber and into the compartments defined by the ribs for impingement cooling of the outer wall, the vane having a first opening in communication with at least one compartment of the outer wall and one of the cavities to enable passage of the cooling medium between the one compartment and the one cavity.

In a further preferred embodiment according to the present invention, there is provided a turbine vane segment, comprising a stator vane having an inner wall, the inner wall having a plurality of ribs along an inner surface thereof defining a plurality of compartments inwardly of the inner surface for receiving the cooling medium from the one cavity and forming structural connections with the vane, a cover for one of the inner wall compartments, an impingement plate in the one inner wall compartment between the cover and the inner surface defining inner and outer chambers on opposite sides of the impingement plate and in the one inner wall compartment, the vane having an opening through a side wall thereof in communication with the inner chamber and another of the cavities for flowing the cooling medium between the inner chamber and the cavity, the impingement plate having openings enabling passage of the cooling medium from the inner chamber into the outer chamber of the inner wall for impingement cooling of the inner wall.

In a still further preferred embodiment according to the present invention, there is provided a stator vane segment, comprising inner and outer walls spaced from one another, a vane extending between the inner and outer walls and having leading and trailing edges, the vane including a plurality of discrete cavities between the leading and trailing edges and extending lengthwise of the vane, the inner and outer walls defining respective chambers and an impingement plate in each chamber, an inlet into the outer wall for flowing steam into the outer wall chamber through the impingement plate in the outer wall chamber for impingement steam cooling another surface of the outer wall, an insert in one of the cavities for receiving spent impingement steam from the outer wall and having impingement openings for directing the steam received from the outer wall against interior wall surfaces of one cavity for impingement cooling of the vane about one cavity, the inner wall having an opening for receiving the spent impingement steam from one cavity into the inner wall chamber for flow through the impingement plate therein and impingement cooling of the inner wall, an insert in another of the cavities for receiving spent impingement steam from the inner wall and having impingement openings for directing the steam received from the inner wall against interior wall surfaces of another cavity for impingement cooling of the vane about the inner cavity, an outlet for receiving the spent impingement steam from another cavity, whereby the steam flow through the inner and outer walls, one cavity and another cavity constitutes a closed circuit through the vane and a trailing edge cavity through the vane for receiving air from an air inlet and passing the air through openings in the trailing edge for cooling the trailing edge.

In a still further preferred embodiment according to the present invention, there is provided a stator vane segment for forming part of a stage of a turbine and connection with an inner shell of the turbine, comprising inner and outer walls spaced from one another, a stator vane extending between the inner and outer walls and having leading and trailing edges, the vane including a plurality of discrete cavities between the leading and trailing edges and extending lengthwise of the vane for flowing a cooling medium and a hook connected to the vane and projecting outwardly of the outer wall for supporting the stator vane from the inner turbine shell, the inner and outer walls, the vane and the hook being formed of an integral casting.

In a still further preferred embodiment according to the present invention, there is provided a turbine vane segment, comprising inner and outer walls spaced from one another, a vane extending between the inner and outer walls and having leading and trailing edges, the vane including a plurality of discrete cavities between the leading and trailing edges and extending lengthwise of the vane for flowing a cooling medium, the outer wall having a plurality of ribs along an outer surface thereof defining a plurality of compartments outwardly of the outer surface for receiving the cooling medium and forming structural connections with the vane, a cover for each compartment, impingement plates in the compartments between the covers and the outer surface defining outer and inner chambers on opposite sides of the impingement plates and in the compartments, a cooling medium inlet for the segment, the ribs having openings for enabling passage of the cooling medium from the inlet into the outer chambers of the compartments, the impingement plates having openings enabling passage of the cooling medium from the outer chambers into the inner chambers for impingement cooling of the outer wall, the vane having a first opening through a side wall thereof in communication with at least one compartment of the outer wall and one of the cavities to enable passage of the cooling medium between one compartment and one cavity.

In a still further preferred embodiment according to the present invention, there is provided a stator vane segment for forming part of a stage of a turbine, comprising inner and outer walls spaced from one another, a stator vane extending between the inner and outer walls and having leading and trailing edges, the vane including a plurality of discrete cavities between the leading and trailing edges and extending lengthwise of the vane for flowing a cooling medium, the inner wall having a plurality of ribs along an inner surface thereof defining a plurality of compartments inwardly of the inner surface for receiving the cooling medium and forming structural connections with the vane, a cover for one of the compartments, an impingement plate in one compartment between the cover and the inner surface defining inner and outer chambers on opposite sides of the impingement plate and in the one compartment, the vane having an opening through a side wall thereof in communication with the inner chamber and one of the cavities for flowing the cooling medium between one cavity and inner chamber, the impingement plate having openings enabling passage of the cooling medium from the inner chamber into the outer chamber for impingement cooling of the inner wall.

In a still further preferred embodiment according to the present invention, there is provided a turbine vane segment, comprising inner and outer walls spaced from one another, a vane extending between the inner and outer walls and having leading and trailing edges, the vane including a plurality of discrete cavities between the leading and trailing edges and extending lengthwise of the vane for flowing a cooling medium, at least one cavity of the vane having a plurality of ribs projecting inwardly of an inner wall surface of the vane at spaced locations along the length of the vane, an insert sleeve within one cavity and engaging the ribs defining discrete gaps between the insert sleeve and the inner wall of the vane at spaced locations along the vane, an inlet to the insert sleeve for flowing the cooling medium into the insert sleeve, the insert sleeve having a plurality of openings therethrough for flowing the cooling medium through the sleeve openings into the gaps for impingement against an inner wall surface of the vane, the insert and the inner wall surface of the vane defining a channel therebetween and along a side wall of the vane in communication with the gaps for receiving the cooling medium flowing into the gaps.

Accordingly, it is a primary object of the present invention to provide a novel and improved stator vane segment having open and closed cooling circuits for a turbine.

BRIEF DESCRIPTION OF THE DRAWINGS

FIG. 7 is a perspective view of an impingement cooling insert;

FIG. 8 is a perspective view of the insert illustrated in FIG. 8;

FIGS. 9, 10 and 11 are cross-sectional views thereof taken generally about on lines 9—9, 10—10 and 11—11 in FIG. 7;

FIG. 12 is an enlarged fragmentary cross-sectional view illustrating the inlet opening to the insert;

FIG. 22a is a schematic view through the stator vane illustrating the cooling flow paths through the inner side wall;

BEST MODE FOR CARRYING OUT THE INVENTION

Figure 1:
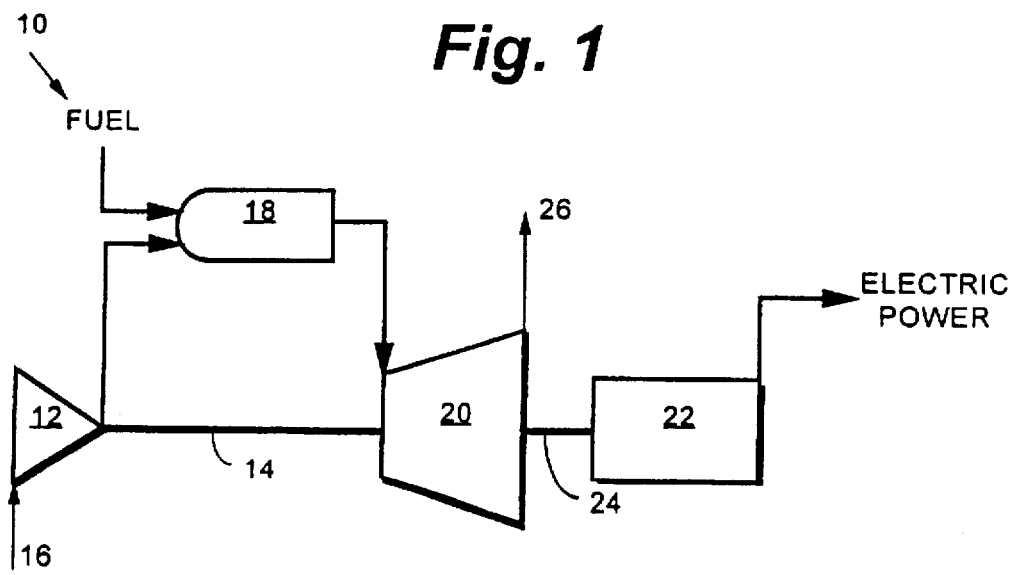
FIG. 1 is a schematic illustration of a gas turbine according to the present invention.

FIG. 1 is a schematic diagram for a simple cycle, single-shaft heavy-duty gas turbine 10 incorporating the present invention. The gas turbine may be considered as comprising a multi-stage axial flow compressor 12 having a rotor shaft 14. Air enters the inlet of the compressor at 16, is compressed by the axial flow compressor 12 and then is discharged to a combustor 18 where fuel such as natural gas is burned to provide high-energy combustion gases which drive the turbine 20. In the turbine 20, the energy of the hot gases is converted into work, some of which is used to drive the compressor 12 through shaft 14, with the remainder being available for useful work to drive a load such as a generator 22 by means of rotor shaft 24 for producing electricity. A typical simple cycle gas turbine will convert 30 to 35% of the fuel input into shaft output. All but 1 to 2% of the remainder is in the form of exhaust heat which exits turbine 20 at 26. Higher efficiencies can be obtained by utilizing the gas turbine 10 in a combined cycle configuration in which the energy in the turbine exhaust stream is converted into additional useful work.

Figure 2:
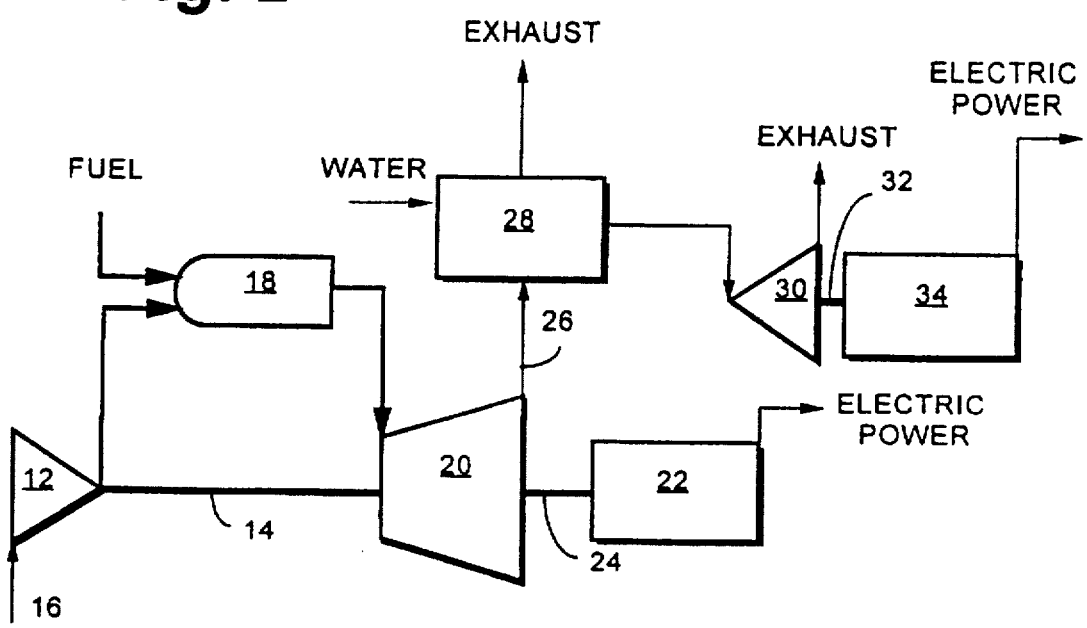
FIG. 2 is a schematic diagram of a combined cycle system employing the gas turbine and heat recovery steam generator for greater efficiency.

FIG. 2 represents a combined cycle in its simplest form, in which the exhaust gases exiting turbine 20 at 26 enter a heat recovery steam generator 28 in which water is converted to steam in the manner of a boiler. Steam thus produced drives a steam turbine 30 in which additional work is extracted to drive through shaft 32 an additional load such as a second generator 34 which, in turn, produces additional electric power. In some configurations, turbines 20 and 30 drive a common generator. Combined cycles producing only electrical power are in the 50 to 60% thermal efficiency range using the more advanced gas turbines.

Figure 3:
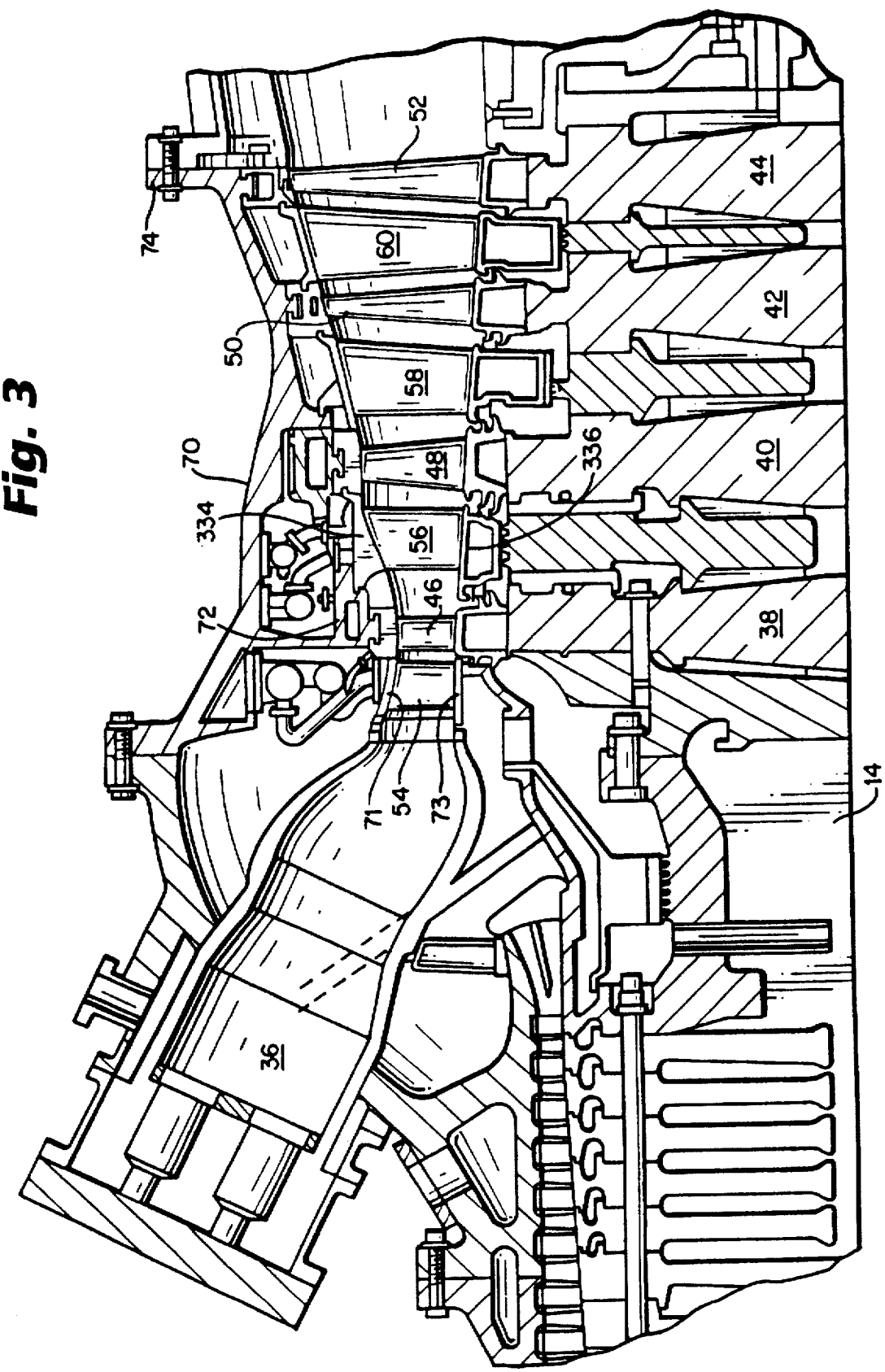
FIG. 3 is a cross-sectional view of a portion of a turbine illustrating the combustor, compressor and turbine sections.

FIG. 3 illustrates in greater detail the gas turbine which is the focus of the present invention. Air from the compressor 16 is discharged to the combustion cans located circumferentially about the rotor 14 in the usual fashion, one such "can" being shown at 36. Following combustion, the resultant gases are used to drive the gas turbine 20, which includes in the instant example four successive stages represented by four wheels 38, 40, 42 and 44 mounted on the rotor 14 for rotation therewith, and each including buckets represented, respectively, by blades 46, 48, 50 and 52, which are arranged alternately between fixed nozzles represented by vanes 54, 56, 58 and 60, respectively. Thus, it will be appreciated that a four-stage turbine is illustrated wherein the first stage comprises nozzles 54 and buckets 46; the second stage, nozzles 56 and buckets 48; the third stage, nozzles 58 and buckets 50; and the fourth stage, nozzles 60 and buckets 52.

Figure 4:
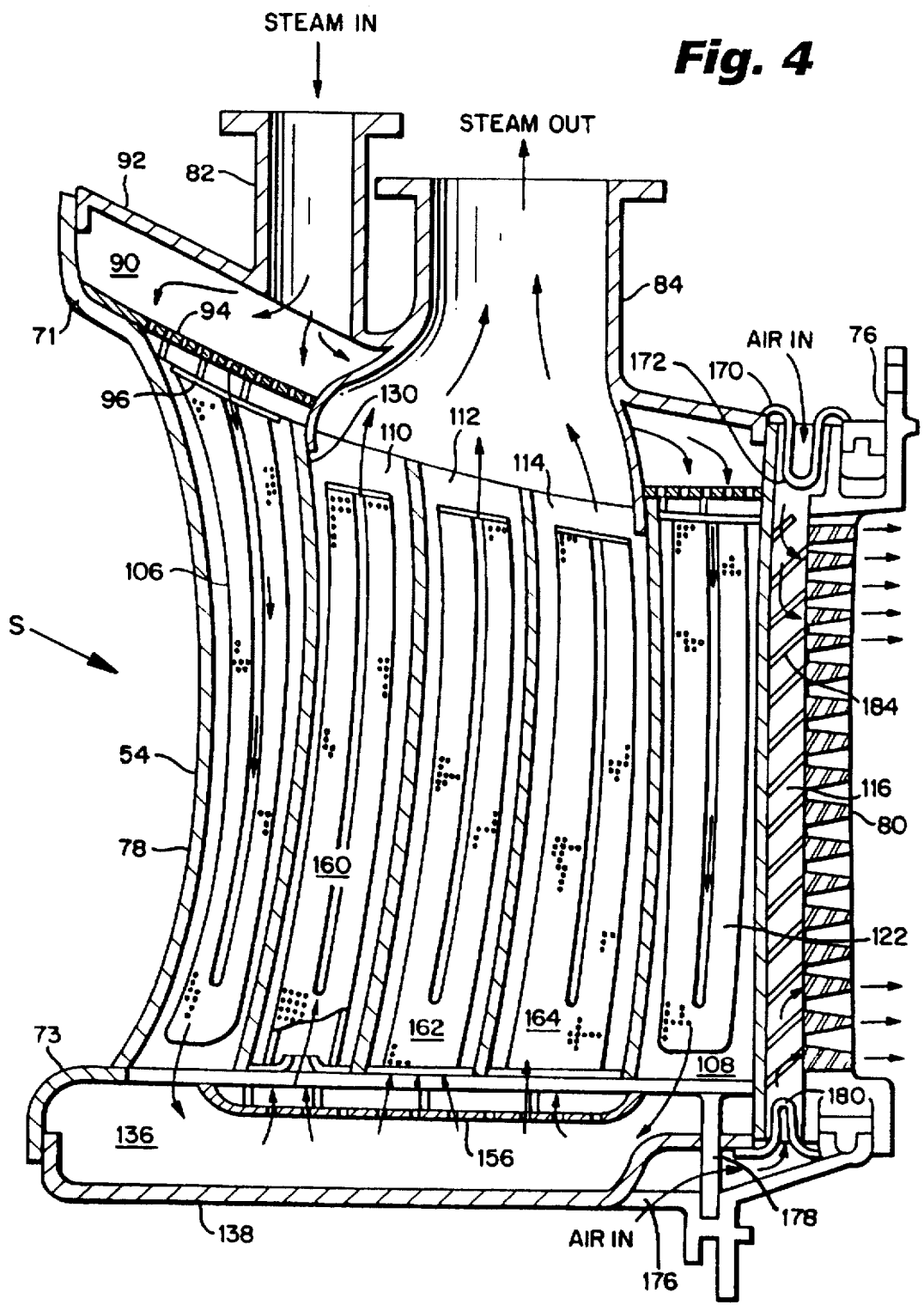
FIG. 4 is an enlarged cross-section view of a first stage nozzle vane according to the present invention.
Figure 5:
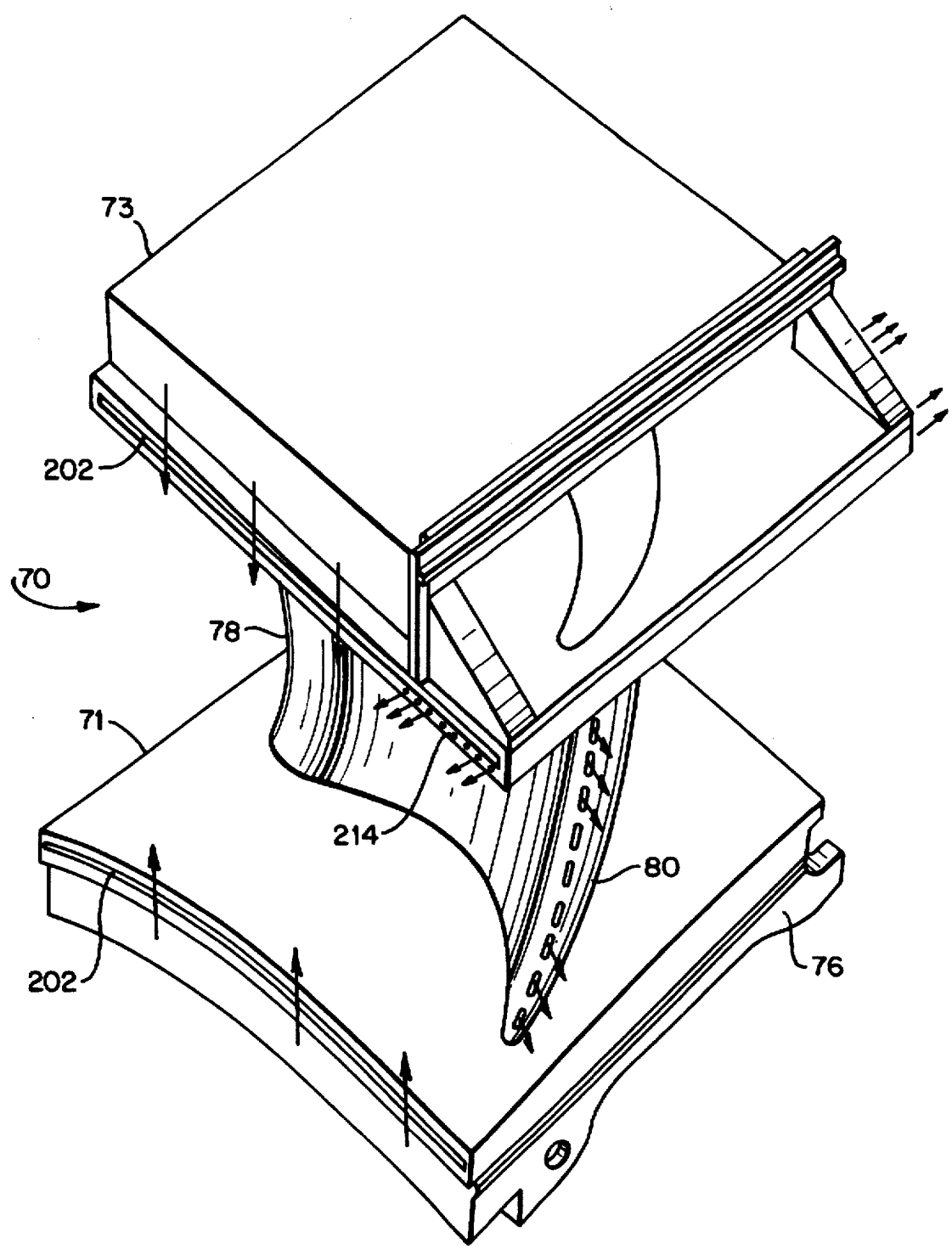
FIG. 5 is a perspective view of a segment containing a first stage nozzle vane.
Figure 6:
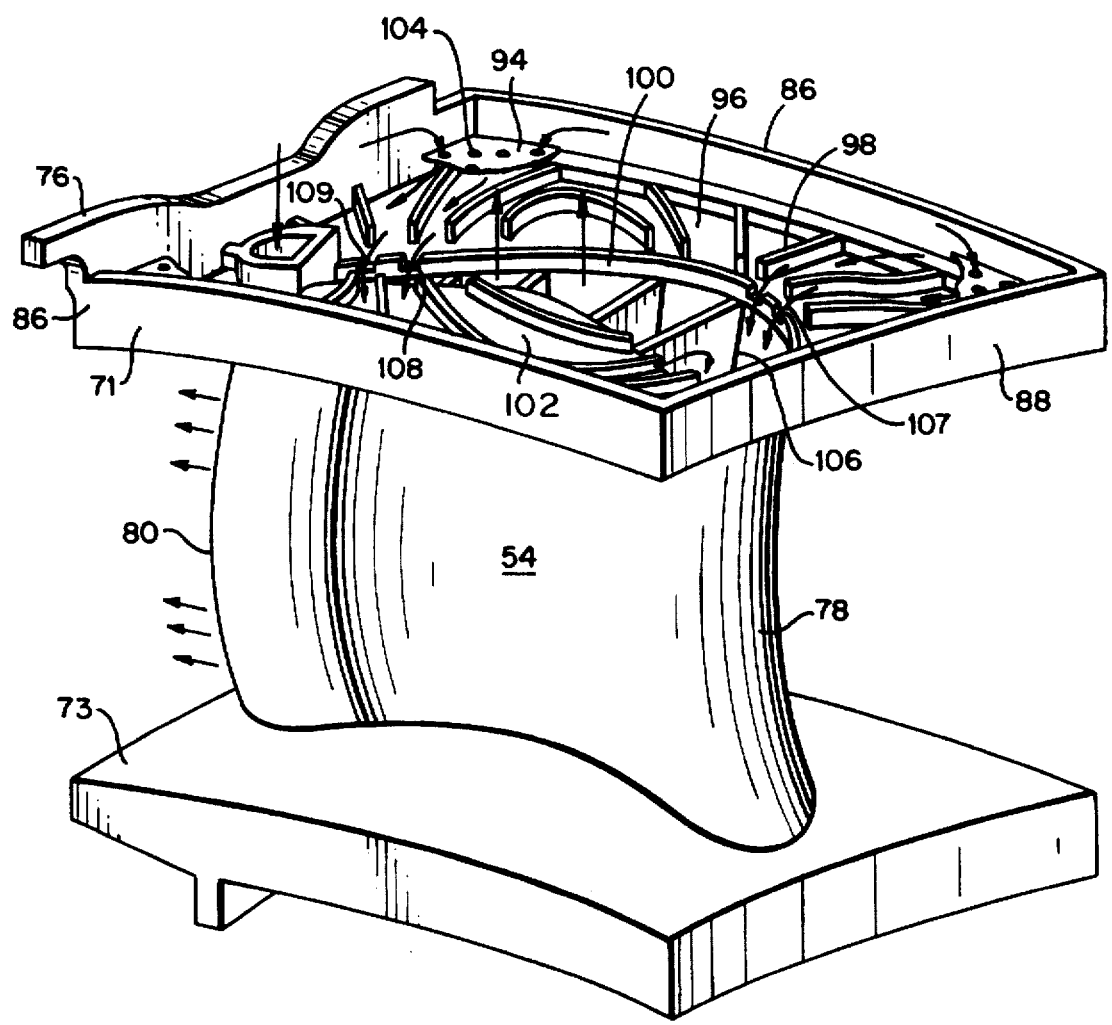
FIG. 6 is a perspective view of the first stage nozzle segment illustrating impingement cooling and flow directing surfaces in the outer wall.

As discussed previously, the present invention is directed to the cooling circuits for the first and second stage nozzles of the illustrated turbine, reference being made to the previously identified patent applications for disclosure of various other aspects of the turbine, its construction and methods of operation. Referring now to FIG. 4, there is illustrated in cross-section a vane 54 comprising one of the plurality of circumferentially arranged segments, generally designated S, which includes a vane 54 of the first stage nozzle. It will be appreciated that the segments S are connected one to the other to form an annular array of segments defining the hot gas path through the first stage nozzle of the turbine. Each segment S includes radially spaced outer and inner walls 71 and 73, respectively, with one or more of the nozzle vanes 54 extending between the outer and inner walls. The segments S are supported about the inner shell 72 of the turbine with adjoining segments being sealed one to the other, as described hereinafter. It will therefore be appreciated that the outer and inner walls and the vanes extending therebetween are wholly supported by the inner shell 72 of the turbine and are removable with the inner shell halves of the turbine upon removal of the outer shell 70 secured to an outer turbine casing at flange 74 as set forth in co-pending application Ser. No. 08/414,698, now U.S. Pat. No. 5,685,693. The outer wall 71 is connected directly to the shell 72 at a segment flange 76. For purposes of this description, the vane 54 will be described as forming the sole vane of a segment S, as illustrated in FIGS. 5 and 6, the vane having a leading edge 78 and a trailing edge 80. With the segments S fixed to the inner shell 72, the first and second stage nozzles, i.e., the non-rotating components of the first and second stages, may be removed from the turbine upon removal of the inner shell 72, as set forth in the above-identified patent application, for repair and maintenance and it will also be appreciated that the first and second stage nozzles, to be described, having combined closed circuit steam cooling and air cooling may serve as replacement nozzle stages for wholly air cooled nozzle stages whereby the turbine is converted from the solely air cooled turbine to a combined steam and air cooled turbine.

Referring now to FIGS. 4–6, the first stage nozzle vane segment S has a cooling steam inlet port 82 to the outer wall 71. A return steam outlet port 84 also lies in communication with the nozzle segment S. The outer wall 71 includes, as best illustrated in FIG. 6, outer side railings 86, a leading railing 88, and a trailing segment flange 76 defining a plenum 90 with the upper wall surface 92 and an impingement plate 94 disposed in the outer wall 71. (The terms outwardly and inwardly or outer and inner refer to a generally radial direction). Disposed between the impingement plate 94 and the inner wall 96 of the outer wall 71 are a plurality of structural ribs 98 extending between the side walls 86, forward wall 88 and trailing wall 76 and an upstanding extension 100 of the airfoil shape of the vane within the outer wall 71. The ribs 98 define chamber 102 closed on all sides except in a direction towards the extension 100. The impingement plate 94 overlies the ribs 98 throughout the full extent of the plenum 90. Consequently, steam entering through inlet port 82 into plenum 90 passes through the openings 104 in the impingement plate 94 for impingement cooling of the inner surface 96 of the outer wall 71.

The first stage nozzle vane 54 has a plurality of cavities, for example, the leading edge cavity 106, an aft cavity 108, three intermediate return cavities 110, 112 and 114, and also a trailing edge cavity 116. As illustrated in FIG. 6, the leading edge cavity 106 and the aft cavity 108 have their wall extensions interrupted by openings 107 and 109, respectively, enabling the spent impingement cooling steam between surface 96 and impingement plate 94 to flow through the openings 107 and 109 and radially inwardly into the cavities.

Each of the leading edge cavity 106 and aft cavity 108 have an insert 120 and 122, respectively, while each of the intermediate cavities 110, 112 and 114 have similar inserts 160, 162 and 164, respectively, all such inserts being in the generally form of hollow sleeves. The general form of the inserts is illustrated in FIGS. 7–12. That is, the insert illustrated in FIGS. 7–12 may be shaped to correspond to the shape of the particular cavity in which the insert is to be provided, the drawing illustrations of FIGS. 7–12 not representing any particular insert but representing only the general shape of the insert. The insert illustrated in FIGS. 7–12, for example, insert 120, comprises an elongated sleeve 124 having an open upper or radially outer end with a marginal flange 126 for connection with a marginal flange, not shown, about the opening to the corresponding cavity, e.g., cavity 106. The side walls of the sleeve 124 are provided with a plurality of impingement cooling openings 128. The openings 128 are provided along portions of the insert which lie in opposition to the wall of the cavity to be impingement cooled. For example, in the leading edge cavity 106, the forward edge of the insert would be arcuate and the side walls would generally correspond in shape to the side walls of the cavity 106, all such walls of the insert having impingement openings 128. The back side of the sleeve 124 in opposition to the rib 130 separating the cavity 106 from cavity 110, however, would not have impingement openings 128. In the aft cavity 108, the side walls only of the insert sleeve 124 would have impingement openings 128, the forward and aft walls of insert sleeve 124 being of a solid non-perforated material.

Referring back to FIGS. 7–12, the insert has one or more channels which increase in volume in the direction of the flow of the thermal medium through the sleeve. As illustrated in FIG. 10, the return channel constitutes bifurcated portions of the sleeve. That is, the sleeve 124 divides into sections 124a and 124b in a downstream direction, with the channel 132 between the sections 124a and 124b increasing in cross-sectional area in the direction of steam flow. In the instance of the insert 120 for the leading edge cavity, the return channel 132 may comprise a channel opening only to the trailing or aft side of the insert, with the impingement holes 128 opening through the opposite sides and curved leading edge portion of the insert for impingement cooling of the sides and leading edge of the vane. A bottom stiffener or lower cover plate 134 is provided at the downstream end of the sleeve 124.

It will be appreciated that the inserts received in cavities 106, 108, 110, 112 and 114 are spaced from the walls of the cavities to enable steam flow through the impingement openings 128 to impact against the interior wall surfaces of the cavities, hence cooling the wall surfaces. To minimize degradation, the steam is directed to the return channel 132 within the sleeve so that the impingement flow is not impeded by flow of spent impingement cooling steam.

Figure 13:
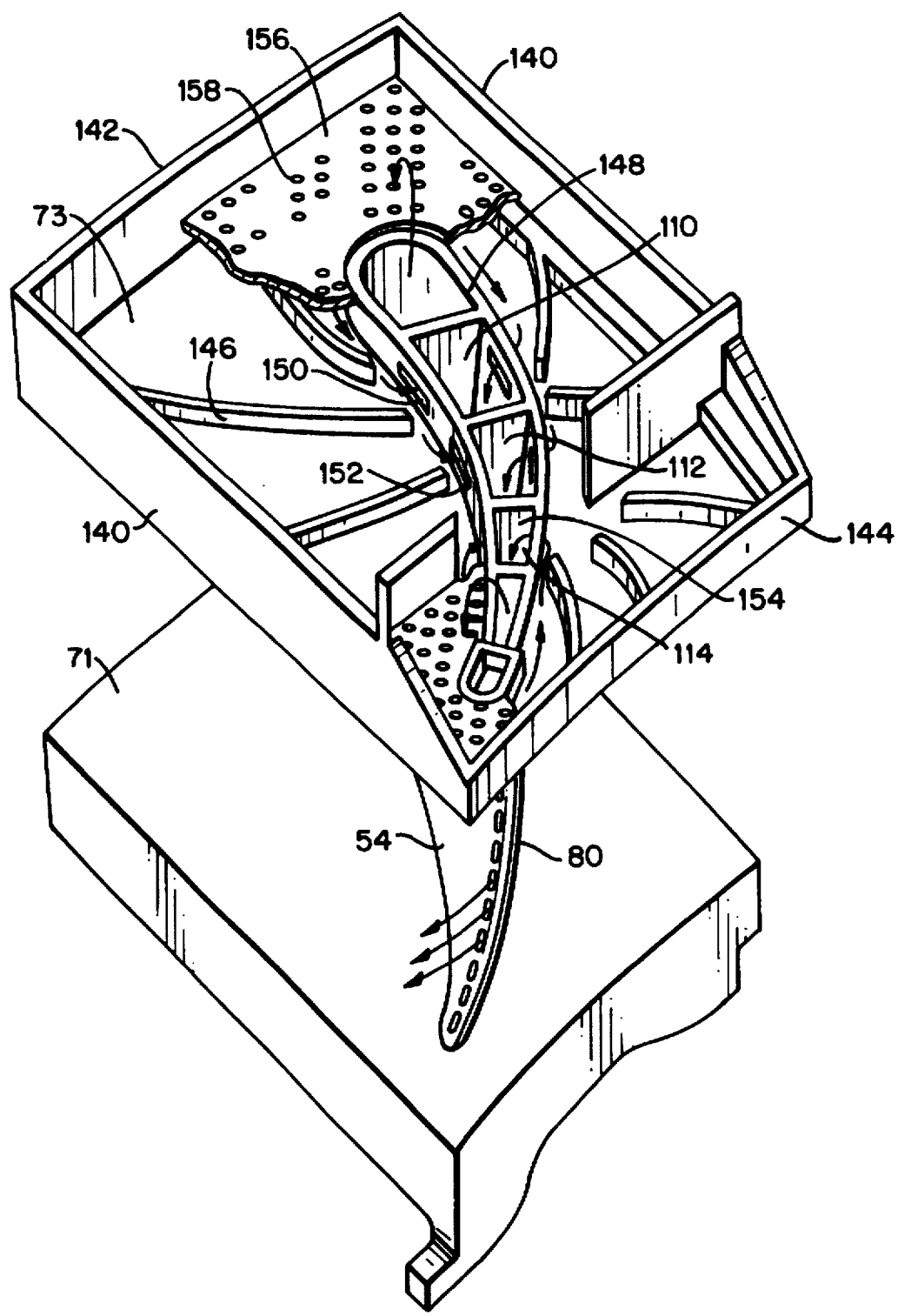
FIG. 13 is a perspective view of a first stage nozzle segment illustrating the inner side of the inner wall and the cooling passages therein.

As illustrated in FIG. 4, the post-impingement cooling steam flows from the return channel 132 at the inner ends of the inserts 120 and 122 into a plenum 136 defined by the inner wall 73 and a lower cover plate 138. Referring to FIG. 13, the inner wall 73 includes the cover plate 138, and side rails 140, forward rail 142 and aft rail 144. Structural strengthening ribs 146 are integrally cast with the inner wall 73 and extend from the side, front and aft rails toward extensions of the vane extending through the inner wall 73. As illustrated in FIG. 13, the extensions 148 of the vane 54 have openings 150, 152 and 154 communicating with the cavities 110, 112 and 114, respectively. Radially inwardly of the ribs 146 is an impingement plate 156 which receives the extension 148. As a consequence, it will be appreciated that the spent impingement cooling steam flowing from cavities 106 and 108 flow into the plenum 136 for flow through the impingement openings 158 of impingement plate 156 for impingement cooling of the inner wall 73. The spent cooling steam flows by direction of the ribs 146 towards the openings 150, 152 and 154 for return flow through the cavities 110, 112 and 114, respectively, to the steam outlet 84. Inserts 160, 162 and 164 are disposed in the cavities 110, 112 and 114 in spaced relation from the side walls and ribs defining the respective cavities. The impingement openings lie on opposite sides of the sleeves 160, 162 and 164 for flowing the steam from within the inserts through the impingement openings for impingement cooling of the side walls of the vane. The return channels 132 open through the forward and aft portions of the insert sleeves adjacent the ribs defining the cavities to prevent degradation of the performance of the impingement cooling steam. The spent cooling steam then flows out the port 84 for return to the steam supply. In all of the steam impingement regions, including the outer and inner walls and the walls of the vane, dimples are formed along the interior surfaces of the surfaces to be cooled to increase the surface area and improve heat transfer.

Turning now to the air cooling component of the combined steam and air cooling circuits hereof, the first stage includes a trailing edge 80 having a trailing edge cavity 116 which receives high pressure air from the compressor discharge. For example, there is provided an air inlet to cavity 116 opening through the outer wall 71 and which inlet 170 is exposed to the compressor discharge region about the first stage nozzle. The compressor discharge air enters inlet 170 through an impingement cup 172 for cooling the fillet between the outer wall 72 and vane 54. Because the lower end of the trailing edge cavity 116 is not in communication with the high pressure region, a passage 176 opens through the inner wall cover plate 138 and through an opening in a rail 178 for flow through a cooling impingement cup 180 at the inner end of cavity 116. Thus, cooling air enters the opposite ends of the trailing edge cavity 116. The trailing edge cavity has a plurality of angled ribs 182 and 184 along the opposite interior walls. The ribs are angled in a radial outward direction to enhance the heat transfer effect with the ribs on the opposite sides being substantially perpendicular to one another. By angling the ribs perpendicular to one another along the opposite sides of the trailing edge cavity 116, the ribs prevent flow towards one side rather than along both sides and effect a uniform turbulent flow throughout the cross-section of the trailing edge cavity 116. Thus, the ribs 184 may angle upwardly in a forward-to-aft direction, while the ribs 182 may angle upwardly in an aft-to-forward direction. Additionally, there are provided a plurality of cooling passages 186 in communication with cavity 116 for flow of the turbulated cooling air along the passage walls and into the hot gas stream. The passages 186 are convergent in an aft direction for structural purposes and have oppositely angled ribs along the opposite wall, similarly as in cavity 116, to increase the turbulence of the cooling air flow.

Figure 14:
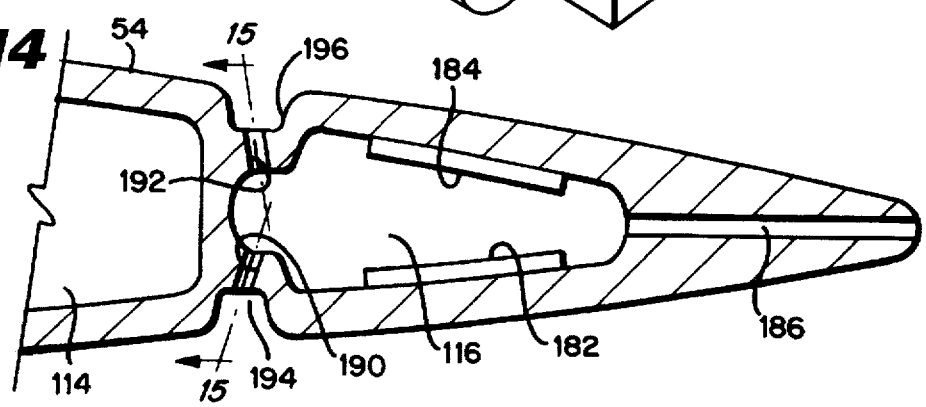
FIG. 14 is an enlarged cross-sectional view of the trailing edge of the nozzle vane of FIG. 4 illustrating an air film cooling arrangement.
Figure 15:
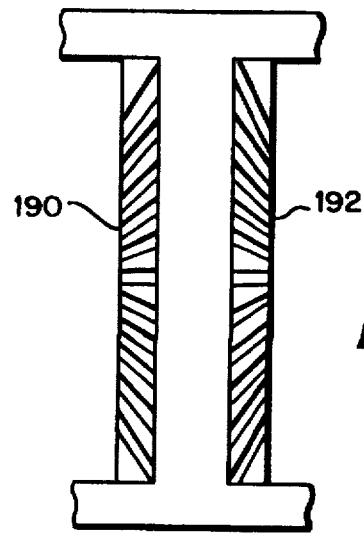
FIG. 15 is a cross-sectional view thereof taken generally about on line 15—15 in FIG. 14.
Figure 16:
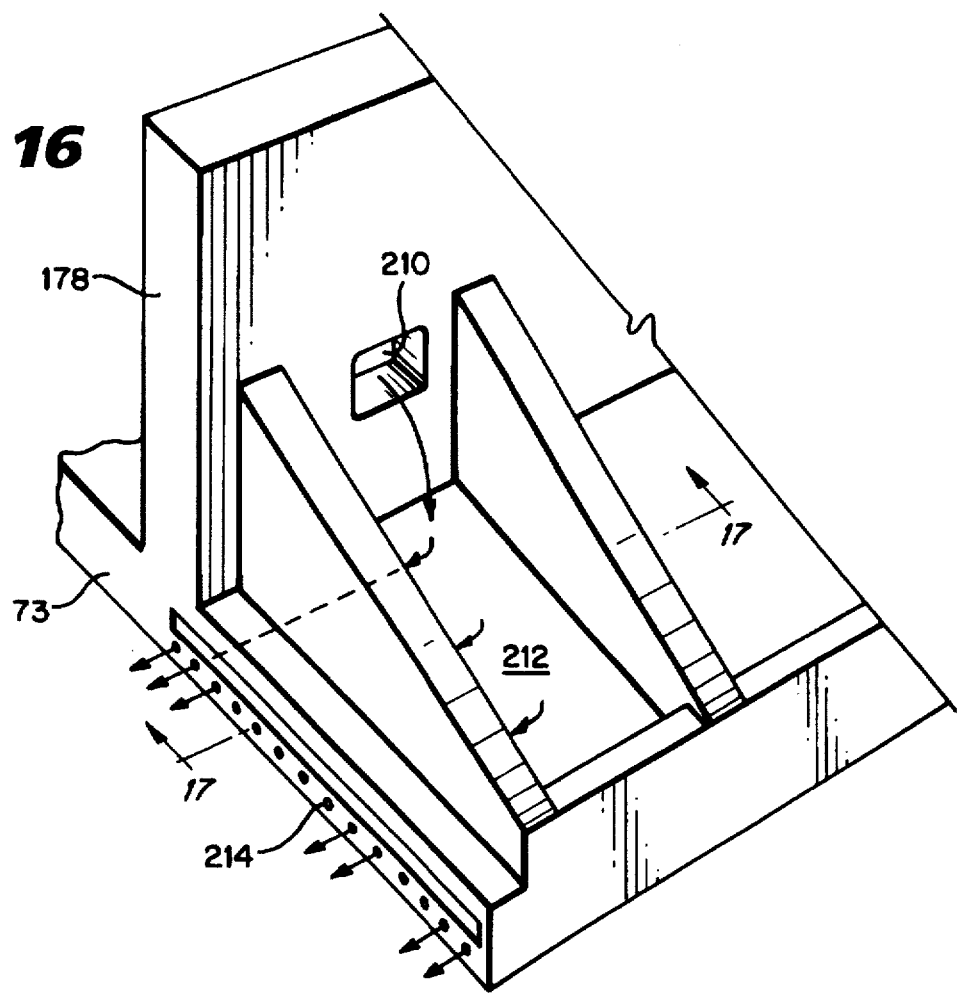
FIG. 16 is a fragmentary enlarged perspective view of a trailing portion of the inner wall illustrating the air cooling of the inner wall edges.
Figure 17:
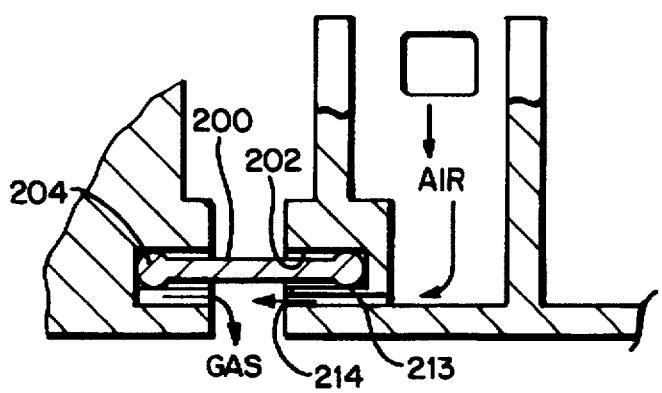
FIG. 17 is a reduced fragmentary cross-sectional view taken generally about on line 17—17 in FIG. 16.

In addition, there is provided an air film cooling flow along the opposite side walls of the vane adjacent the trailing edge. It will be appreciated that as the air flows toward the pitch line of the trailing edge cavity 116, the cooling air is being heated and also loses velocity. As a consequence, the cooling air loses its convective effectiveness. To compensate, an air film flow is provided which becomes increasingly effective toward the pitch line. To provide the air film flow, a plurality of cooling openings 190 and 192 are provided along opposite sides of the vane in communication with the trailing edge cavity 116. The openings 190 and 192 are angled toward the pitch line and at decreasing angles relative to the pitch line as the holes appear closer to the pitch line. Additionally, the air film holes 190 and 192 are angled in a forward direction, as best illustrated in FIG. 14, and terminate in troughs 194 and 196 formed on opposite sides of the vane. The troughs 194 and 196 form a discontinuity along the outer surface of the vane, slowing the momentum of the air flow through the holes as the air flow enters the hot gas stream by increasing the volume into which the cooling air enters. In this manner, a laminar flow along the trailing edge is maintained, while the cooling air flowing through the openings 192 and 194 cools the area of the vane furthest from the steam-cooled cavity 114 to avoid formation of hot spots along the edge of the troughs. The openings 192 and 194 are angled forwardly approximately 10° relative to a perpendicular to the vane surface. The size of the film holes 192 and 194 are two diameters deep and two diameters wide relative to the size of the troughs, i.e., the holes have a 40 mil diameter and the trough is therefore 80 mils wide and 80 mils deep.

Figure 18:
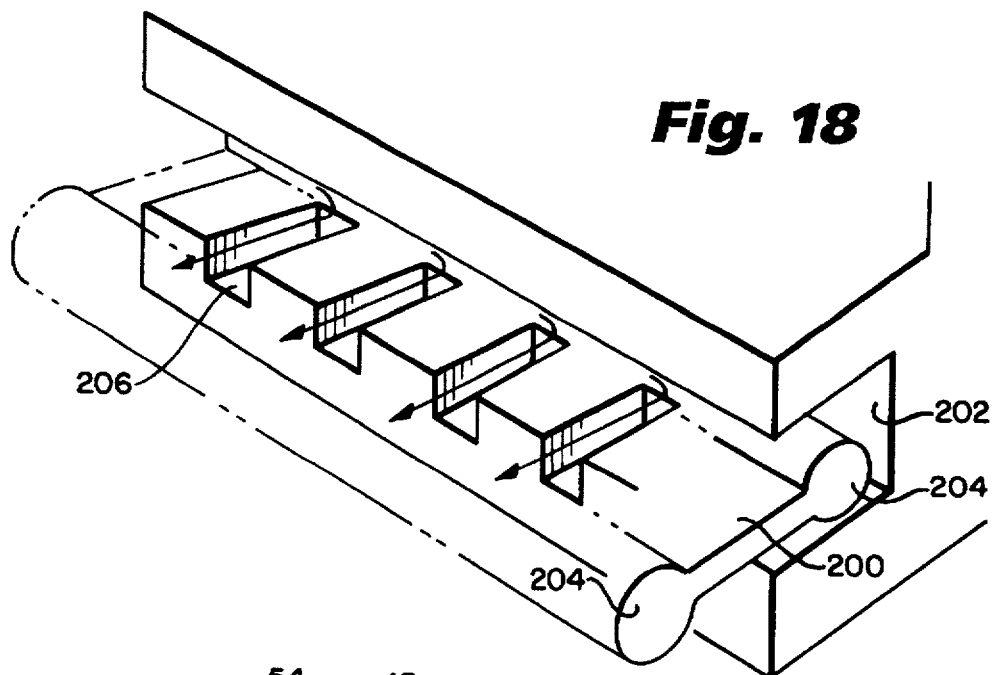
FIG. 18 is an enlarged fragmentary perspective view illustrating the side seal and air cooling between adjacent segments.

Referring now to FIGS. 5 and 16–18, edge cooling along the adjoining outer wall segments and forward portions of adjoining inner wall segments is provided by dogbone seals 200 and convection bypass slots 202. The seals 200 are elongated and have enlargements 204 at opposite ends for reception in slots 202. In FIG. 18, a slot 202 is illustrated and may have a series of recesses for circumferentially directed sub-slots 206 forming one or both of the walls of the slot 202. In this manner, high pressure cooling air from the compressor discharge region may flow through the slots 202 and sub-slots 206, cooling the edges of the inner and outer walls between respective adjacent segments.

Aft of the inner rail where the pressure differential is inadequate across the seal to provide cooling air, cooling air is supplied from the high pressure region in communication with compressor discharge air forwardly of a rail 178 (FIGS. 5 and 16) through openings 210 which pass the high pressure air into a chamber 212 aft of rail 178. A series of passages in the inner wall 73 communicate the high pressure cooling air between chamber 212 and the side edges of the segments, the passages 213 terminating in openings 214 illustrated in FIGS. 5 and 16.

It will be appreciated that thermal barrier coatings are used on all gas path surfaces to reduce cooling requirements. Segment axial loads are taken out at inner and outer chordal hinges. The radial segment loads are taken out by a shoulder bolt and lap joint at the aft end of the outer band. The tangential segment loads are taken out via the same shoulder bolt. The inner rail is sealed by a leaf seal. The aft end of the inner wall is slanted to minimize the radial component of the wheel space purge flow.

Figure 19:
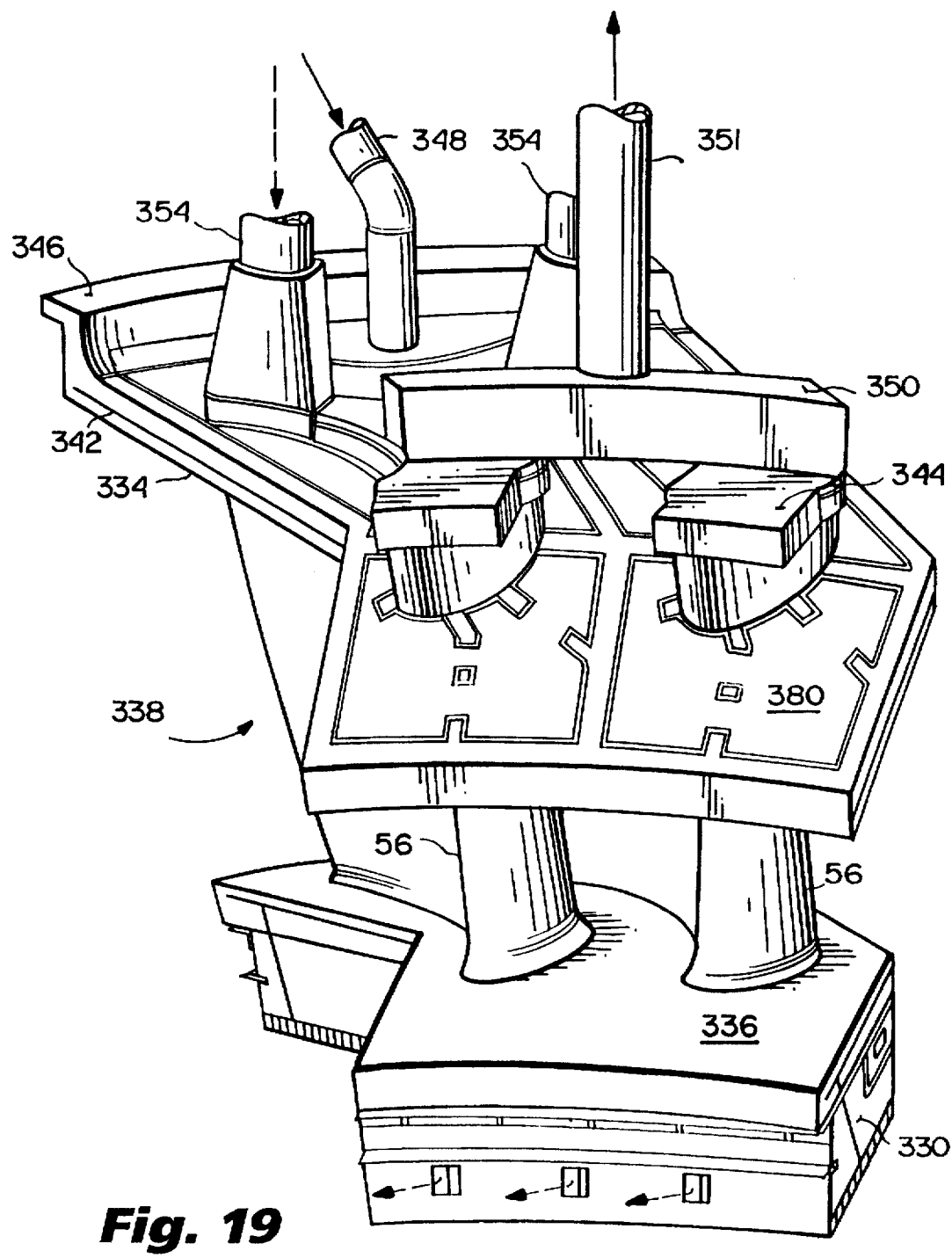
FIG. 19 is a perspective view of a second stage stator vane segment as viewed from its inlet side.

Referring now to FIG. 19, there is illustrated a second stage nozzle vane segment generally designated 338, each segment including outer and inner walls 334 and 336 respectively with one or more nozzle vanes 56 extending between the outer and inner walls. It will be appreciated that the segments 338 are spaced circumferentially one from the other about the inner shell 72 of the turbine and are supported from the inner shell 72. The adjoining segments are sealed one to the other by leaf or dogbone-type seals D.S. (FIG. 22) situated in grooves 342 formed along the side edges of each of the outer and inner walls 334 and 336, respectively. Thus, the outer and inner walls as well as the vanes, similarly as the non-rotating component parts of the first stage nozzle, are wholly supported by the inner shell 72 of the turbine and removable therewith. To provide such support, one or more supporting hooks 344 are integrally cast with a corresponding second stage nozzle vane in each segment 338 as well as integrally cast with the outer and inner walls 334 and 336, respectively, to provide the necessary structural support. An aft supporting hook 346 is formed on the aft side of the outer wall 334. These supporting hooks 344 and 346 are structurally interconnected with the inner shell 72 as illustrated in FIG. 3.

Still referring to FIG. 19, and to provide the cooling circuit for the second stage nozzle vane segment, there is provided a cooling medium inlet port 348 for supplying cooling medium, preferably steam, to the outer and inner walls and the vanes of the segment. A return cooling medium plenum 350 is disposed adjacent the upper ends of the vanes 56 for receiving the spent cooling medium for exhaust through a discharge 351. A pair of air inlets 354 are also disclosed for flowing air into the vanes along the trailing edges thereof for exiting into the diaphragm 330 and into the wheel cavities as described hereinafter.

Figure 20:
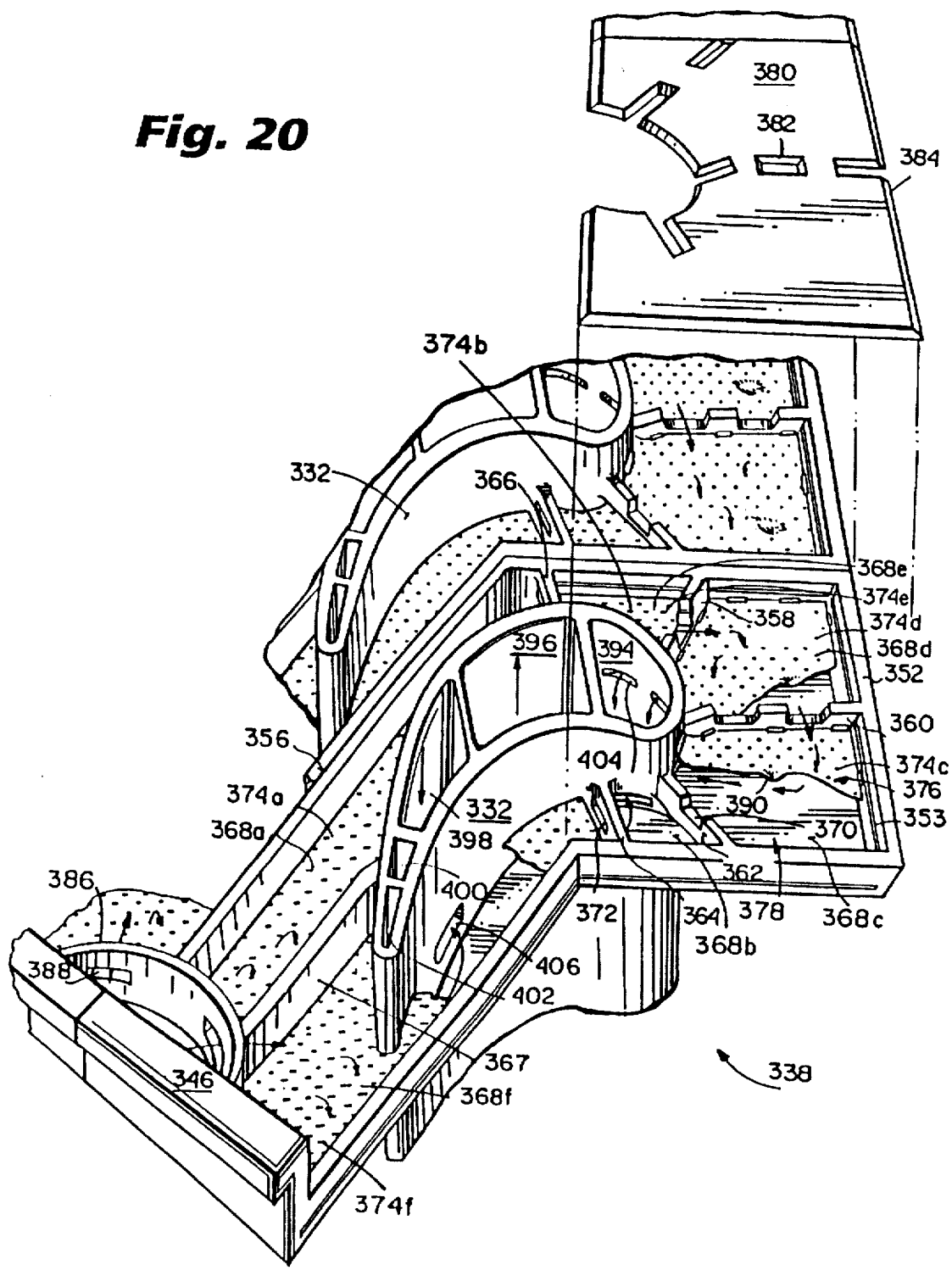
FIG. 20 is a fragmentary perspective view of an outer side wall for the turbine segment illustrated in FIG. 19 with the covers removed illustrating the cooling flow compartments in the outer side wall and the communication of the cooling flow with the vane.
Figure 21:
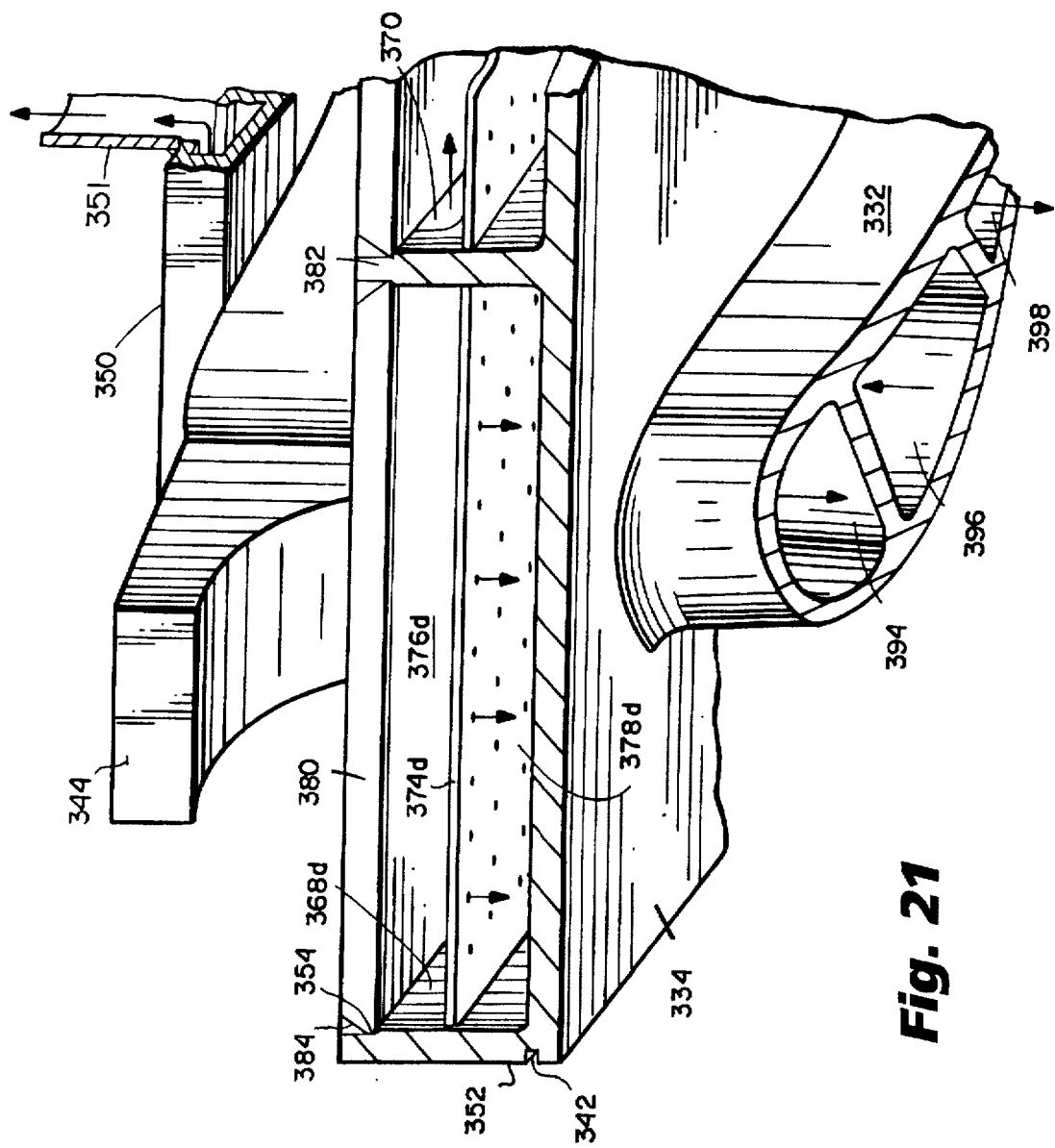
FIG. 21 is a fragmentary enlarged perspective view with portions broken out and in cross section illustrating the forward portion of a stator vane segment including a hook in the outer wall.

It will be appreciated that in the present description, each second stage nozzle segment preferably comprises a pair of vanes 56 between outer and inner walls 334 and 336, respectively, although it will be appreciated that a fewer or greater number of vanes can be employed in each segment as desired. Referring to FIGS. 20 and 21, each segment 338 includes outer railings 352 projecting outwardly along the outer margins of outer side wall 334. Thus, the railings 352 define the marginal edges of the segment 338 with the exception that the aft hook 346 forms the outer margin along the aft side of the segment. Each railing 352 has an inner platform or flange 353. A mid-segment rib 356 extends from the leading railing 352 to the aft hook 346 and between the vanes 56 which project through the outer side wall 334. Additionally, internal railings 358, 360, 362, 364, 366 and 367 are integrally cast with the vanes and the inner and outer side walls as well as the hooks. The internal railings 358, 362, 364 and 366 extend from the side railing and mid-rib for connection with the outer ends of the vanes while the railing 360 extends from the outer railing 352 to the vane and railing 367 extends from arcuate wall 386 to the vane. As illustrated, it will be appreciated that these railings divide the back side of the outer wall 334 into a plurality of compartments 368a–368f, for example, the compartment 368c defined between internal railings 360 and 362 and outer railing 352. Each of the internal railings is either undercut, for example, at 370 or provided with an opening therethrough, for example, at 372 whereby the various compartments defined by the internal railings lie in communication one with the other.

Each compartment 368a–368f is provided with a perforated impingement plate 374a–374f, respectively, which divides the compartment into outer and inner chambers 376, 378, for example, the outer and inner chambers 376d and 378d separated by impingement plate 374d as illustrated in FIG. 21. A plurality of cover plates are provided for the compartments 368. Each cover plate 380 is provided with openings or slots 382 for receiving correspondingly located portions of the internal railings to locate the cover in overlying position relative to the compartments and to the flange 353. The covers 380 are beveled along their edges 384 to permit TIG welding onto the segment. Thus, to the extent so far described, it will be appreciated that a cooling medium, preferably steam, provided to each segment through inlet 348 flows into a plenum defined by the aft hook 346 and an arcuate wall 386 (FIG. 20) for flow through openings 388 into the outer chambers 376 of compartments 368. It will also be appreciated that the steam flows into the outer chambers 376 through the undercuts or openings in the internal railings and then passes through perforations in the impingement plates 374 into inner chambers 378 of compartments 368 for impingement cooling of the outer wall 334 as illustrated in FIG. 21. It will be appreciated that the impingement plates may have inwardly projecting dimples 390 to space the impingement plates 374 from the outer wall 334 to define the inner chambers. Also from a review of FIG. 20, it will be appreciated that each vane 56 has a plurality of internal cavities, preferably five cavities 394, 396, 398, 400 and 402. As described hereinafter, steam is supplied through the forward and intermediate cavities 394 and 398 to the inner side wall 336 and returns to the outer side wall through an intermediate cavity 396. To supply the steam to the leading and intermediate cavities 394 and 398, openings 404 and (FIG. 20) 406 lie in communication with adjacent inner chambers 378 of the compartments.

Figure 22:
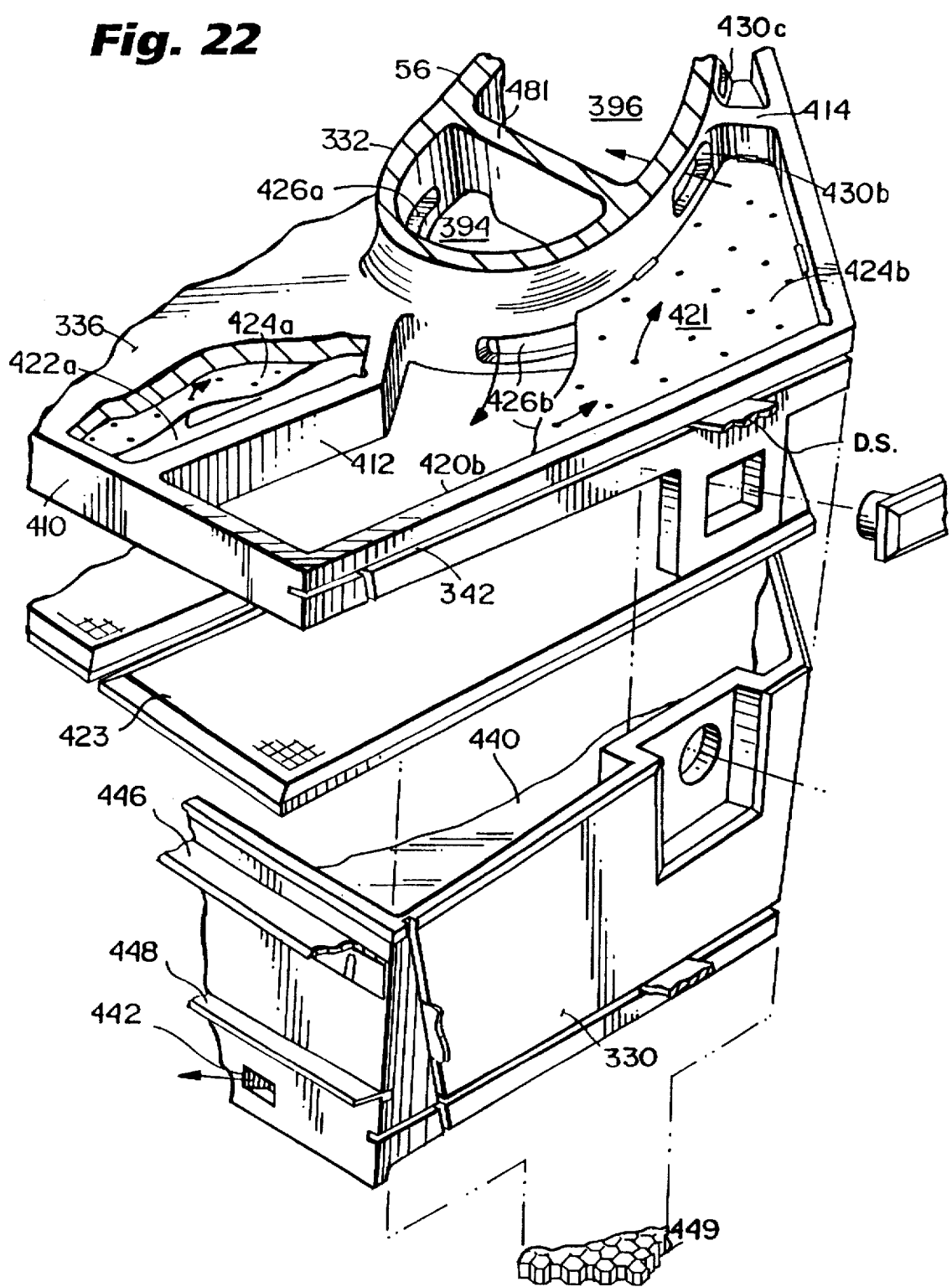
FIG. 22 is a fragmentary perspective view with parts broken out and in cross section illustrating the inner side wall with a diaphragm.

Referring now to FIGS. 22 and 22A, there is illustrated a portion of the inner wall 336 and vane 56, it being appreciated that a pair of vanes 56 are connected to the inner wall 336 of the segment 338. As illustrated, the inner wall 336 has a plurality of inwardly directed side railings 410 as well as interior railings 412, 414, 416 and 418 defining along the inner side wall a plurality of compartments 420a, 420b, 420c and 420d. The compartments are also defined in part by inner covers 423 secured, preferably by welding, to the side and interior railings of the inner side wall 336. Impingement plates 421 are disposed in each compartment dividing the compartments into inner chambers 422a, 422b, 422c and 422d and outer chambers 424a, 424b, 424c and 424d. As illustrated in FIG. 22A, each of the cavities 394 and 398 has a pair of openings 426a, 426b and 428c, 428d, respectively, for flowing the cooling medium into the inner chambers 422a, 422b and 422c, 422d, respectively, of the inner compartments 420 of the inner side wall 336. It will be appreciated that the flow of cooling medium into the inner chambers 422 enables the flow to pass generally radially outwardly through the perforations in the impingement plates 421 into the outer chambers 424a, 424b, 424c and 424d for impingement cooling of the inner side wall 336. As illustrated in FIGS. 22 and 22A, the outer chambers 424a, 424b, 424c and 424d communicate with the return cavity 396 of vane 56 by way of openings 430a, 430b, 430c and 430d, respectively. Return cavity 396 communicates with the plenum 350 (FIG. 19) for exhausting the spent cooling medium through the discharge 351.

As indicated previously, cooling air passes through inlets 354 directly into the aft cavities 400 and 402 of each vane 56. The cavities 400 and 402 exhaust the cooling air through the inner side wall 336 and the covers 423 into the diaphragm 330. The covers 423, the side walls and inner wall 440 of the diaphragm 330 define a plenum 441. Adjacent each of the forward and aft sides of the plenum are apertures 442 and 444 respectively for flowing the extraction air into the wheel spaces on axially opposite sides of the diaphragm. It is also possible to use pipe connections with nozzles between exhausts of cavities 400 and 402 to accelerate air flow toward apertures 442 and 444. The openings are formed such that they provide a tangential air flow into the wheel space cavities. Seals 446 and 448 are formed along the forward and aft sides of the diaphragm for sealing with the adjacent angel wings of the turbine wheels. The pumping action of the turbine rotor forces the air flow to proceed around the seals 446 and 448. To reduce leakage, a metallic honeycomb 449 is provided along the inner side of diaphragm 330. The honeycomb seals are brazed directly onto the bottom of the diaphragm. The spacer which rotates has a plurality of labyrinthine knife edges for extending into the honeycomb seal for reducing the air leakage.

Figure 23:
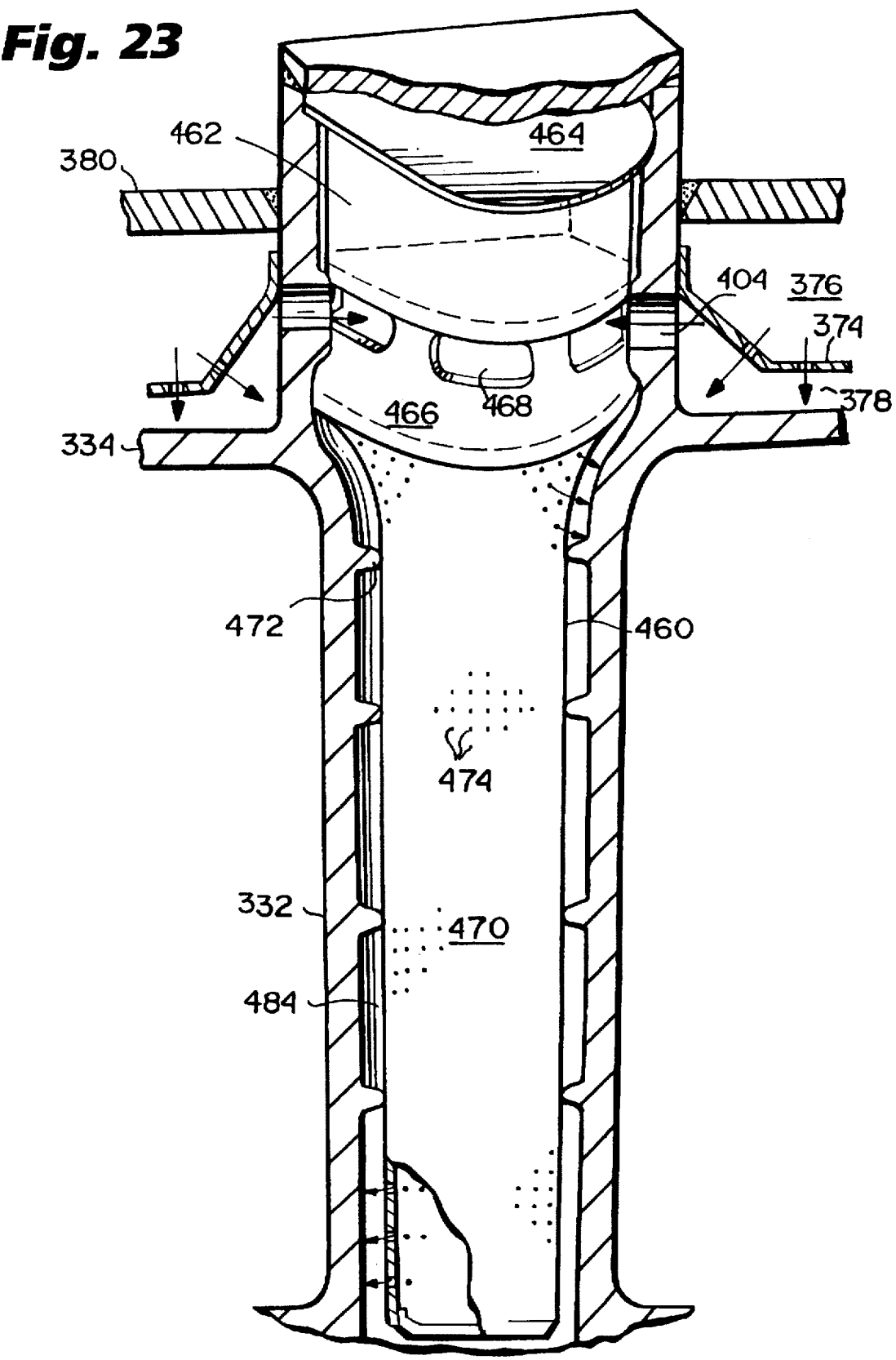
FIG. 23 is an enlarged cross sectional view through a vane and the outer side wall illustrating the flow of the cooling medium within the vane.

Referring now to FIG. 23, there is illustrated the leading edge of the vane 56. The leading edge cavity 394 is provided with an insert 460 and which insert 460 is provided in three different sections to facilitate manufacture. An outer section 462 is used to locate and position the insert 460 within the vane. The outer section 462 includes a collar 464 which is secured, for example, by brazing to an intermediate section 466. Collar 464 rests on a flange formed in the upper end of the vane. Intermediate section 466 includes a plurality of openings 468 which lie in communication with the openings 404 of the inner chambers of the compartments 368b–368f. Thus, post-impingement cooling medium from the inner chamber 378 of outer side wall 334 passes through openings 404 and openings 468 of the insert 460 for flow inwardly through the lower section 470. Note also that the intermediate section 466 is secured to the vane 332 inwardly of the openings 404 such that flow of the cooling medium from the inner chambers through openings 404 must pass through openings 468 and cannot pass between intermediate section 466 and the inner wall of the vane. Preferably the intermediate section 466 may be brazed to the inner wall of the vane.

Figure 24:
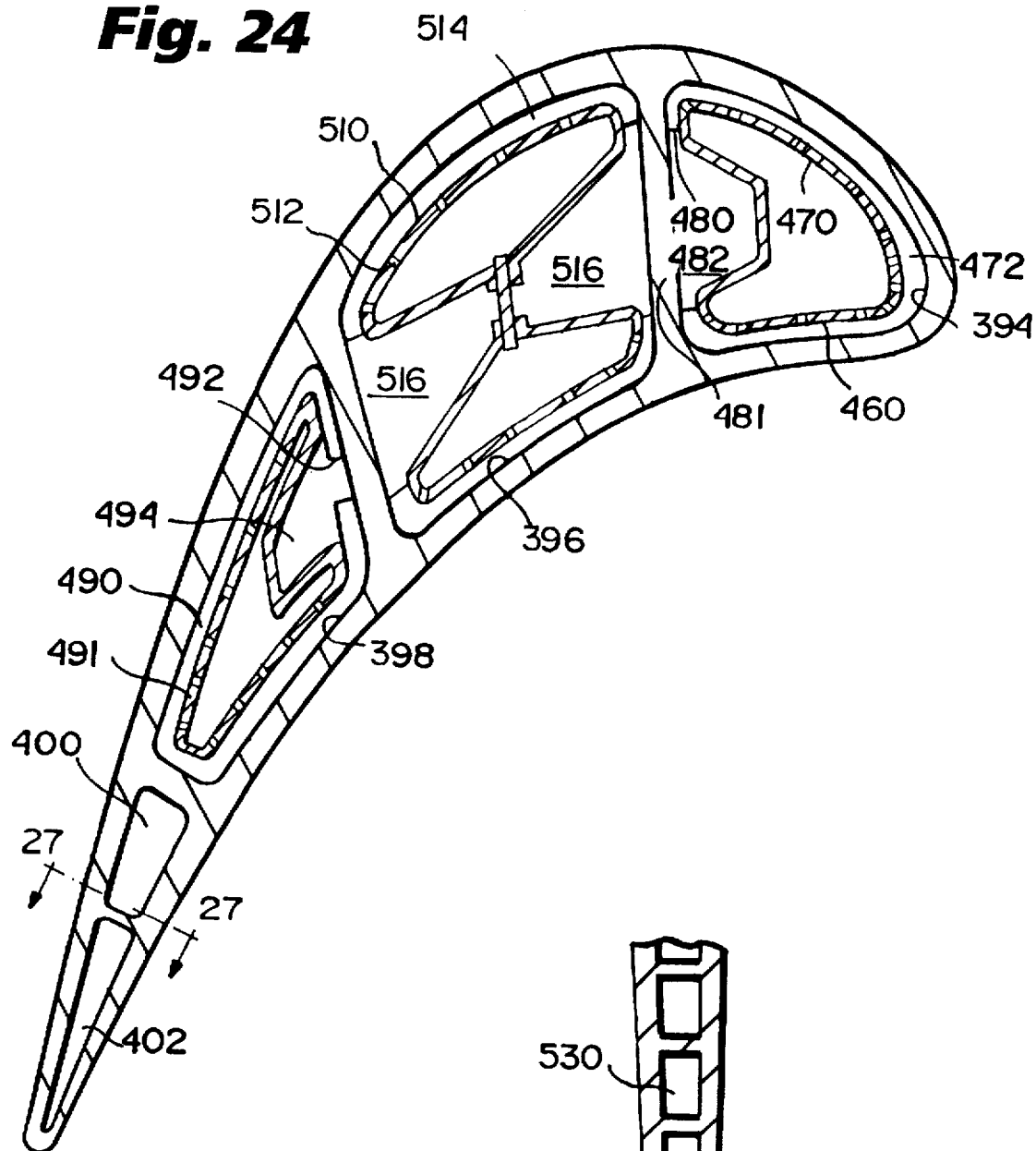
FIG. 24 is an enlarged cross-sectional view of the vane.

Within the vane, there is provided at radially spaced locations along the vane a plurality of inwardly directed projections or ribs 472 for spacing the lower section 470 of insert 460 from the inner surfaces of the walls of the vane. The lower section 470 has a plurality of impingement flow openings 474 such that the steam flowing inwardly along the lower section 470 of insert 460 passes through openings 474 for impingement cooling against the interior surfaces of vane 56 between the ribs 472. As best illustrated in FIG. 24, ribs 472 do not extend wholly about the interior of cavity 394. Rather, ribs 472 extend about the interior surfaces of the exterior walls of the cavity and terminate at 480 adjacent the interior dividing wall 481 between the cavities. Additionally, insert section 470 is recessed to define a channel 482 in communication with each of the gaps 484 formed between the insert section 470 and the interior wall of the vane. As illustrated in FIG. 23, the bottom of the flow passage within insert section 470 is closed whereby the cooling medium flowing in channel 482 is directed through the openings 426a and 426b (FIGS. 22 and 22A) into the inner chambers 422a and 422b of the inner wall 336.

Referring to FIG. 24, a similar type of insert 491 is provided in vane cavity 398. As illustrated, the peripheral outline of insert 491 follows the contour of the shape of cavity 398 and has a plurality of radially spaced inwardly directed structural ribs 490 which terminate at ends 492 and define gaps between insert 491 and the interior wall of cavity 398. A channel 494 is formed in and along the forward side of the insert. The insert has impingement openings whereby steam directed into the insert through openings 406 (FIG. 20) flows outwardly through the impingement openings for impingement cooling of the outer walls of the vanes on opposite sides of the cavity 398. The post-impingement cooling medium then flows generally forwardly along ribs 490 into channel 494 for flow toward the inner wall 336.

Figure 25:
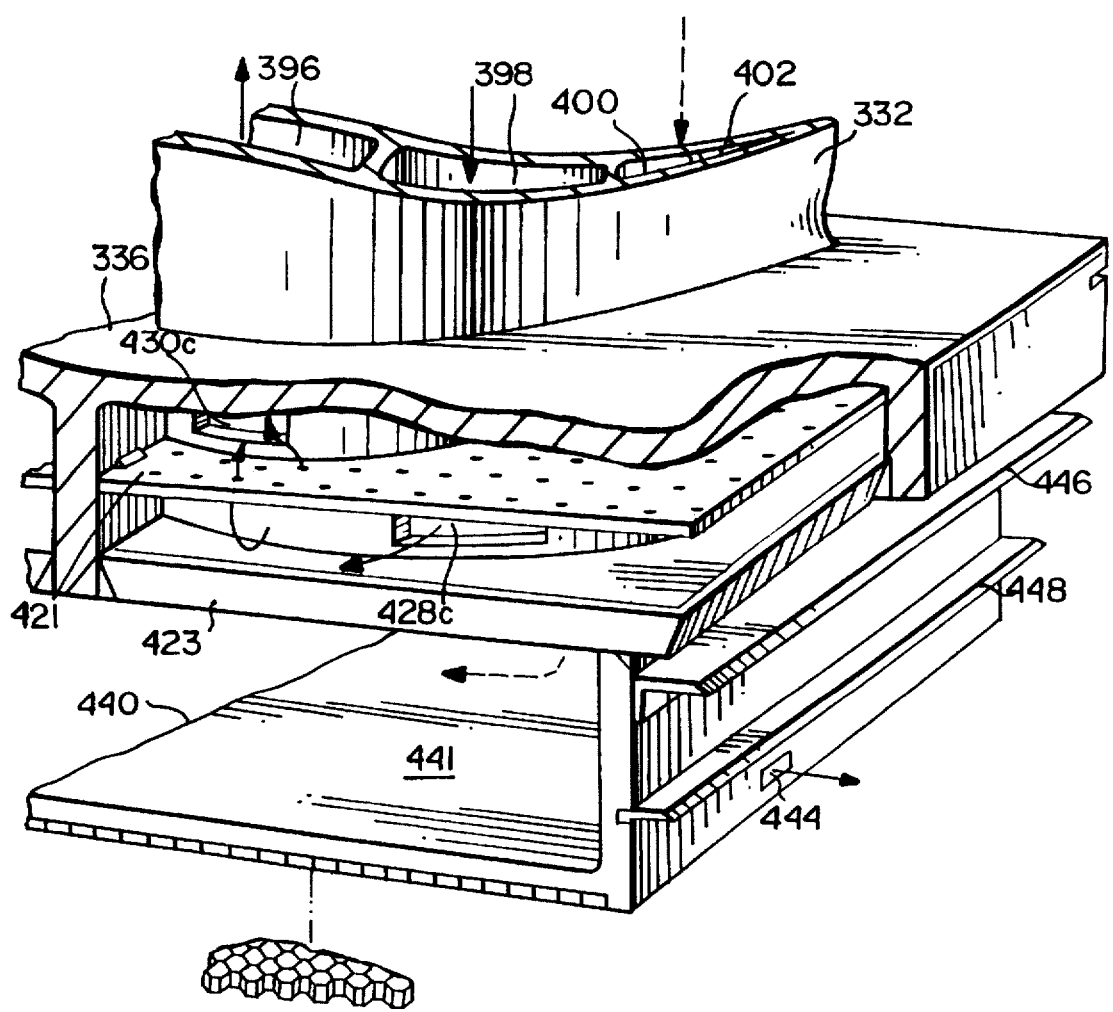
FIG. 25 is a fragmentary perspective view with parts broken out and in cross section of the inner side wall and diaphragm adjacent the trailing edge of the vane.
Figure 26:
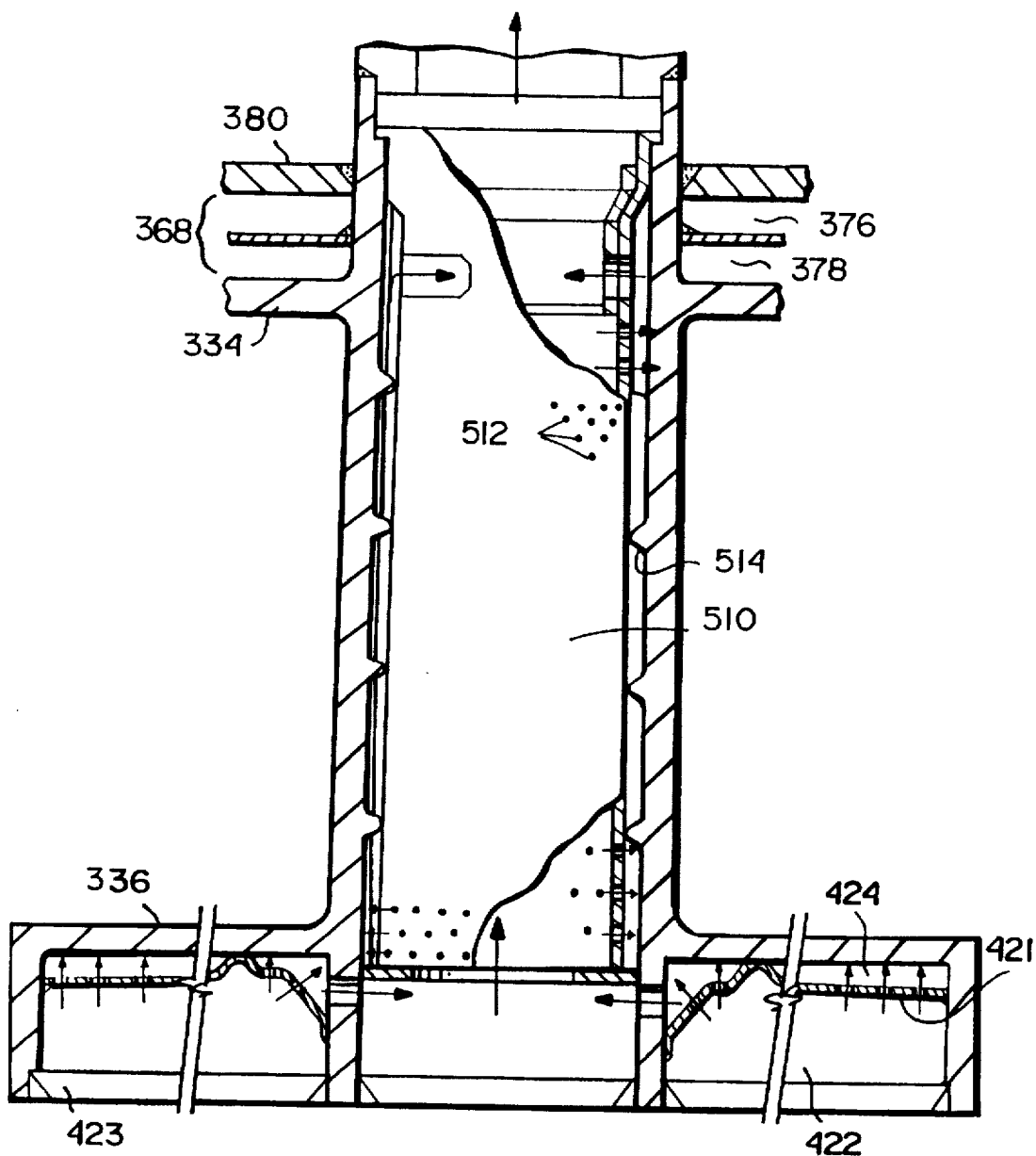
FIG. 26 is a fragmentary cross sectional view of the vane with portions in elevation illustrating the return flow of the cooling medium from the inner side wall through the vane.

Referring to FIGS. 22A and 25, the post-impingement cooling medium from cavity 398 flows through openings 428c, 428d into the inner chambers 422c, 422d, respectively, of the inner side wall 336 for flow through the perforations of the impingement plates 421 in compartments 420c, 420d for impingement cooling of the inner side wall 336 before returning through openings 430c, 430d, respectively, to intermediate cavity 396. Intermediate cavity 396 similarly has a double insert 510 having a plurality of perforations or openings 512. Ribs 514 spaced radially along the walls of cavity 396 project inwardly toward insert 510 and terminate at opposite ends of the cavity to define a pair of channels 516 at opposite ends of the cavity. The cooling medium thus flows radially outwardly within insert 510, through the impingement perforations for impingement cooling of the walls of the cavity 396 and into chambers 516 (FIG. 24). The spent cooling medium then egresses chambers 516 of cavity 396 into plenum 350 for flow through discharge 352.

The operation of the cooling circuit for the second stage nozzle will now be described. The cooling medium, preferably steam, is supplied to the cooling inlet 348. Referring to FIG. 20, the cooling steam flows into the outer chambers 376 of the outer side wall 334 by way of openings 388, 372 and undercuts 370. The steam flows radially inwardly through the perforations in the impingement plates 374 for egress into the inner chambers 378 and impingement cooling of outer side wall 334. The post-impingement cooling steam flows through openings 404 and 406 for flow into the inserts 460 and 491 in the forward and intermediate cavities 394 and 398, respectively. The cooling steam flows through the impingement perforations in the inserts and into the gaps between the ribs 472, 490 along the interior surfaces defining the vane cavities for impingement cooling of those surfaces. The post-impingement steam then flows into the channels 482 and 494 along the interior walls of the cavities 394 and 398, respectively. The post-impingement steam from channels 482 and 494 then flows into the inner chambers 422a, 422b and 422c, 422d, respectively, of the inner side wall 336 by way of openings 426a, 426b and 428c, 428d. The steam reverses direction and flows outwardly through the perforations in the impingement plates 421 of compartments 420a, 420b, 420c and 420d into the outer chambers 424a, 424b, 424c and 424d of the inner side wall 336 for impingement cooling thereof. The post-impingement steam then flows through openings 430a, 430b, 430c and 430d in the vane and into the insert 510 in the intermediate cavity 396. The spent steam then flows through perforations 512 in the insert 510 for impingement cooling of the opposite side walls of the cavity 396 (FIG. 24), the post-impingement steam flowing into the channels 516 for return to the plenum 350 for exhaust through discharge 352. It will thus be appreciated that a closed steam cooling circuit has been described.

Figure 27:
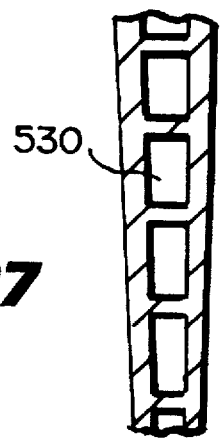
FIG. 27 is a cross sectional view thereof taken generally about on line 27—27 in FIG. 24.

Additionally, the air cooling circuit includes air input through inlets 354 into the cavities 400 and 402 for cooling the trailing edge of the vane. As illustrated in FIG. 27, the cavities lie in communication one with the other by way of openings 530. The air exits into the plenum 440 of the diaphragm 30 for exit through openings 442 and 444 at the leading and trailing ends of the diaphragm and into the wheel cavities.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine having an axis, comprising:
   inner and outer shells spaced one from the other and about said axis;
   a plurality of stator vane segments in a circumferential array about said axis and forming part of a turbine stage, each said segment including inner and outer walls spaced from one another;
   a stator vane extending between said inner and outer walls and having forward leading and aft trailing edges, said vane including a plurality of discrete cavities between the leading and trailing edges and extending lengthwise of said vane for flowing a cooling medium; and
   a forward hook connected to said vane and spaced radially outwardly of said outer wall for supporting said stator vane from said inner turbine shell, said inner and outer walls, said vane and said hook being formed of an integral casting.

2. A stator vane segment for forming part of a stage of a turbine and connection with an inner shell of the turbine, comprising:
   inner and outer walls spaced from one another;
   a stator vane extending between said inner and outer walls and having forward leading and aft trailing edges, said vane including a plurality of discrete cavities between the leading and trailing edges and extending lengthwise of said vane for flowing a cooling medium;
   a forward hook connected to said vane and spaced radially outwardly of said outer wall for supporting said stator vane from the inner turbine shell, said inner and outer walls, said vane and said hook being formed of an integral casting; and
   a closed-circuit cooling system for said stator vane comprising at least one cavity of said vane having a plurality of ribs projecting inwardly of an inner wall surface of said vane at spaced locations along the length of said vane, an insert sleeve within said one cavity and engaging said ribs defining discrete gaps between said insert sleeve and the inner wall of said vane at spaced locations along said vane, said insert having an inlet adjacent one of said inner and outer walls for flowing the cooling medium into said insert sleeve, said insert sleeve having a plurality of openings therethrough for flowing the cooling medium through said sleeve openings into said gaps for impingement against an inner wall surface of said vane, said insert and said inner wall surface of said vane defining a channel therebetween along a side wall of said vane in communication with said gaps for receiving the cooling medium flowing into said gaps and directing the cooling medium in a generally radial direction to an outlet adjacent another of said inner and outer walls.

3. A stator vane segment according to claim 2 wherein said ribs terminate short of fully encompassing said one cavity, terminal ends of said ribs defining ends of said gaps opening into said channel.

4. A turbine vane segment, comprising:
   inner and outer walls spaced from one another;
   a vane extending between said inner and outer walls and having leading and trailing edges, said vane including a plurality of discrete cavities between the leading and trailing edges and extending lengthwise of said vane for flowing a cooling medium in a closed circuit through said vane;
   at least one cavity of said vane having a plurality of ribs projecting inwardly of an inner wall surface of said vane at spaced locations along the length of said vane, an insert sleeve within said one cavity and engaging said ribs defining discrete gaps between said insert sleeve and the inner wall of said vane at spaced locations along said vane, an inlet to said insert sleeve adjacent one of said inner and outer walls for flowing the cooling medium into said insert sleeve, said insert sleeve having a plurality of openings therethrough for flowing the cooling medium through said sleeve openings into said gaps for impingement against an inner wall surface of said vane, said insert and said inner wall surface of said vane defining a channel therebetween and along a side wall of said vane in communication with said gaps for receiving the cooling medium flowing into said gaps and directing the cooling medium in a radial direction to an outlet adjacent another of said inner and outer walls.

5. A turbine vane segment, comprising:
   inner and outer walls spaced from one another;
   a vane extending between said inner and outer walls and having leading and trailing edges, said vane including a plurality of discrete cavities between the leading and trailing edges and extending lengthwise of said vane between said inner and outer walls, a closed-circuit cooling system through said vane including at least two of said cavities;
   an insert sleeve within each of said at least two cavities and spaced inwardly of inner wall surfaces of said vane defining a volume therebetween, an inlet to each of said insert sleeves for flowing a cooling medium into said insert sleeves, each said insert sleeve having openings therethrough for flowing the cooling medium through said openings into said volumes for impingement against the inner wall surfaces of said vane, a first of said two cavities having an outlet in communication with the inlet to a second of said two cavities, said outlet and the inlet to said second of said two cavities lying adjacent said inner wall, an outlet for said second cavity passing through said outer wall, whereby the cooling medium flows through said first cavity in one direction through said second cavity in a generally opposite direction, and through said outer wall; and a third cavity of said plurality of cavities comprising a trailing edge cavity having a plurality of openings through a wall of said vane for flowing cooling air from said trailing edge cavity through said third cavity openings into a region external of said vane.

6. A turbine vane segment according to claim 5 wherein at least certain of said plurality of openings in communication with said trailing edge cavity are spaced one from the other along one of the opposite sides of said vane to provide air film cooling of said vane along said one side thereof.

7. A turbine vane segment according to claim 6 wherein said third cavity openings include openings extending through the trailing edge of said vane.

8. A turbine vane segment according to claim 5 wherein said plurality of openings in communication with said trailing edge cavity are spaced one from the other along each of the opposite sides of said vane.

9. A turbine vane segment according to claim 8 including a trough along the outer surface of said vane on said opposite sides thereof with said third cavity openings terminating in said trough.

10. A turbine vane segment according to claim 5 wherein said inlet to said first cavity is located adjacent said outer wall.

11. A turbine vane segment according to claim 10 wherein said first cavity is located along said leading edge of said vane and said second cavity is located between said first and third cavities.

12. A turbine vane segment according to claim 5 wherein at least one cavity of said two cavities has a plurality of ribs projecting inwardly of an inner wall surface portion of said vane at spaced locations along the length of said vane, said insert sleeve within said one cavity engaging said ribs defining discrete gaps in said volumes between said insert sleeve and the inner wall surface portion of said vane at spaced locations along the length of said vane, said plurality of openings through said insert sleeve within said one cavity enabling flow of the cooling medium through said sleeve openings into said gaps for impingement against said inner wall surface portion of said vane, said insert within said one cavity and said inner wall surface portion of said vane defining a channel therebetween and along a side wall of said vane in communication with said gaps for receiving the cooling medium flowing into said gaps.

13. A turbine vane segment according to claim 5 wherein said inner wall includes a plenum in communication with said outlet of said first cavity and said inlet of said second cavity, an impingement plate in said plenum for flowing the cooling medium received from said first cavity outlet through openings in said impingement plate for impingement cooling of an inner wall surface portion having an opposite side thereof exposed to flow of hot gases along a hot gas path of the turbine vane segment, said second cavity inlet lying in communication with the cooling medium passing through the impingement plate openings for flowing spent impingement cooling medium through said second cavity.

* * * * *